(12) United States Patent
Sisto

(10) Patent No.: US 11,067,218 B2
(45) Date of Patent: Jul. 20, 2021

(54) MOUNTING SYSTEM FOR ATTACHING ACCESSORY ITEMS TO A WALL

(71) Applicant: Salvatore Sisto, Bradley Beach, NJ (US)

(72) Inventor: Salvatore Sisto, Bradley Beach, NJ (US)

(73) Assignee: SALTO, LLC

( * ) Notice: Subject to any disclaimer, the term of this patent is extended or adjusted under 35 U.S.C. 154(b) by 0 days.

(21) Appl. No.: 16/220,435

(22) Filed: Dec. 14, 2018

(65) Prior Publication Data

US 2019/0186686 A1   Jun. 20, 2019

Related U.S. Application Data

(60) Provisional application No. 62/598,809, filed on Dec. 14, 2017, provisional application No. 62/648,179, filed on Mar. 26, 2018.

(51) Int. Cl.

| | |
|---|---|
| *F16M 13/00* | (2006.01) |
| *A47B 96/00* | (2006.01) |
| *A47G 1/16* | (2006.01) |
| *A47G 1/17* | (2006.01) |
| *F16B 19/00* | (2006.01) |
| *F16M 13/02* | (2006.01) |
| *A47B 96/06* | (2006.01) |

(52) U.S. Cl.
CPC .............. *F16M 13/02* (2013.01); *A47B 96/06* (2013.01); *A47B 96/061* (2013.01); *F16B 19/00* (2013.01)

(58) Field of Classification Search
CPC ...... F16M 13/02; A47B 96/06; A47B 96/061; F16B 19/00
See application file for complete search history.

(56) References Cited

U.S. PATENT DOCUMENTS

| | | | | |
|---|---|---|---|---|
| 3,989,215 A | * | 11/1976 | Weston | A47B 95/008 248/225.11 |
| 5,303,895 A | * | 4/1994 | Hart | A47G 1/168 248/475.1 |
| 5,342,014 A | * | 8/1994 | Wilson | A47G 1/1686 248/476 |
| 6,322,039 B1 | * | 11/2001 | De Luccia | A47G 1/168 248/222.14 |
| 7,540,456 B2 | * | 6/2009 | Thompson | A47G 1/175 211/105.1 |

(Continued)

*Primary Examiner* — Tan Le
(74) *Attorney, Agent, or Firm* — Belles Katz LLC

(57) ABSTRACT

A mounting system for fastening an accessory item such as a shelf to a wall. The system in one embodiment includes a force-distributing mounting element positioned against the wall and between the item and the wall. The mounting element creates a gap between the item and wall. A cover secured to the item by a fastener is configured to at least partially cover the mounting element, gap, and an upper edge of the item to create an esthetically pleasing appearance. The fastener may extend completely through the cover, item, and mounting element and into the wall to mount the assembly thereto. In some implementations, the mounting element and cover may be omitted and the accessory item may be fastened directly to the wall, which may be hollow or solid. In one configuration, the item may be a cantilevered perimeter frame to which the accessory item is mounted.

18 Claims, 40 Drawing Sheets

(56) References Cited

U.S. PATENT DOCUMENTS

| | | | | |
|---|---|---|---|---|
| 7,708,252 B2* | 5/2010 | Vander Berg | ........ | A47B 96/061 |
| | | | | 248/544 |
| 7,802,766 B2* | 9/2010 | Thompson | .............. | F16B 12/22 |
| | | | | 248/220.1 |
| 8,596,473 B2* | 12/2013 | Newbould | ............... | A47K 1/09 |
| | | | | 211/88.01 |
| 2011/0266404 A1* | 11/2011 | Hsu | ........................ | A47K 10/18 |
| | | | | 248/222.14 |

* cited by examiner

MOUNTING SYSTEM FOR ATTACHING ACCESSORY ITEMS TO A WALL

CROSS-REFERENCE TO RELATED APPLICATIONS

The present application claims the benefit of priority to U.S. Provisional Application No. 62/598,809 filed Dec. 14, 2017 and U.S. Provisional Application No. 62/648,179 filed Mar. 26, 2018; the entireties of which are incorporated herein by reference.

FIELD

The present invention relates generally to wall mounting systems. Particular embodiments of the invention relate to mounting systems for fastening an accessory item, such as a shelf or other object, to a wall in an esthetically pleasing manner.

BACKGROUND

There are many instances where it is desirable to attach an accessory object or item to a wall, ceiling, or other surface. When sufficient structure exists to support the item, such as wood, metal, or masonry substructure, there are a variety of fasteners that will securely attach the item to the surface. However, hollow walls, ceilings, or other surfaces can present a situation where there is no structure behind the particular location of the fastener. For simplicity, the term "wall" will be understood to include walls, ceilings, or any other surface to which a fastener is attached. This presents a problem in that normal fasteners such as screws and nails can be easily pulled out from the wall because the wall material itself (drywall, for example) does not provide the required structure to securely hold the fastener.

Several types of fasteners exist that are specifically designed for use in a hollow wall. However, these designs often require force-distributing elements, such as plates or washers, on the wall surface that can be unsightly. These force-distributing elements can also create a space or gap between the exposed surface or face of the wall and the item being fastened to the wall. This space can cause an opening into which foreign material (such as food in a commercial kitchen) can fall and become lodged. In addition, the force-distributing elements may remain visible after the accessory item is mounted to the wall which may not be esthetically pleasing.

Accordingly, improved mounting systems that include some means of covering the force-distributing elements that also covers any space caused be the force-distributing elements are needed.

SUMMARY

A mounting system according to the present disclosure provides an esthetically pleasing and secure anchoring system for attaching an accessory object or item to a hollow wall. This is accomplished by a special cover plate design that covers force-distributing mounting elements (e.g. plates or washers) on the surface of the wall and also covers any gap between the wall surface and the item or structural support for the item being fastened to the wall. Such accessory items may include shelves, soap dispensers, or other items. In some implementations, the mounting element and cover may be omitted and the accessory item or structural support for the item may be fastened directly to the wall, which may be hollow or solid. In one configuration, a cantilevered rectilinear perimeter frame may be mounted to the wall; which frame in turn supports the accessory item. The frame defines an upwardly open receptacle which receives at least a portion of the accessory item insert (e.g. shelf insert) therein. Various possible configurations and constructions of shelf inserts are disclosed herein. In another configuration, the item be may be a linearly elongated frameless shelf.

According to one aspect, a mounting system for fastening an item to a wall includes: a force-distributing plate configured to be positioned against an outer surface of the wall and between the item and the outer surface of the wall, the force-distributing plate creating a gap between the item and the outer surface of the wall; a cover that, when in an installed position, covers the force-distributing plate, the gap and an upper edge of the item, the cover having a first rear face and a second rear face; and a fastener that extends through the cover, the item, and the force-distributing plate and is configured to fasten the cover, the item, and the force-distributing plate to the wall; wherein the first rear face of the cover contacts the item in an installed position, and the second rear face of the cover contacts the outer surface of the wall in the installed position.

According to another aspect, a mounting system for fastening an accessory to a wall includes: a support structure configured for mounting an accessory thereto, the support structure comprising a plurality of side elements each including a vertical portion and a horizontal portion; a force-distributing plate configured to be positioned against an outer surface of the wall and between the wall and a mountable one of the side elements configured for fastening to the wall, the force-distributing plate creating a gap between the mountable one of the side elements and the outer surface of the wall; a cover configured to cover the force-distributing plate, the gap, and the mountable one of the side elements adjacent to the force-distributing plate, the cover having a first rear face and a second rear face; a fastener that extends through the cover, the mountable one of the side elements, and the force-distributing plate, the fastener being configured to fasten the cover, the mountable one of the side elements, and the force-distributing plate to the wall in stacked relationship; wherein the first rear face of the cover contacts the one of the side elements in an installed position, and the second rear face of the cover contacts the outer surface of the wall in the installed position. In one embodiment, the accessory is a shelf. In another embodiment, the accessory is a soap dispenser.

A method for mounting an item to a wall is also provided. The method includes: providing an item to be mounted to the wall, a cover, and a force-distributing plate configured for placement against a surface of the wall; forming an assembly by inserting in order a threaded shaft of the fastener with an expansion part coupled to the shaft through a hole in the cover, a hole in the item, a hole in the force-distributing plate, and a pre-drilled hole in the wall; abuttingly engaging the force-distributing plate against the wall; and tightening the fastener, wherein the expansion part changes from an unexpanded state prior to tightening to an expanded state securing the item to the wall.

According to another aspect, a shelf support system comprises: a wall defining an outer surface; a perimeter frame formed by a plurality of side elements, at least one of the side elements mounted to the wall which supports the perimeter frame in a cantilevered manner; the perimeter frame defining an upwardly open receptacle; and a shelf insert inserted into the upwardly open receptacle, the perimeter frame circumscribing the shelf insert and at least partially concealing a side surface of the shelf insert, a top surface of the shelf insert being exposed.

According to another aspect, a shelf support system comprises: a wall defining an outer surface; a perimeter frame formed by a plurality of side elements, at least one of the side elements mounted to the wall which supports the perimeter frame in a cantilevered manner; the perimeter frame defining an upwardly open receptacle; and a shelf insert including a lower portion inserted into the upwardly open receptacle and an upper portion defining a top surface which extends beyond top edges of the side elements of the perimeter frame which are not mounted to the wall to form cantilevered overhangs.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
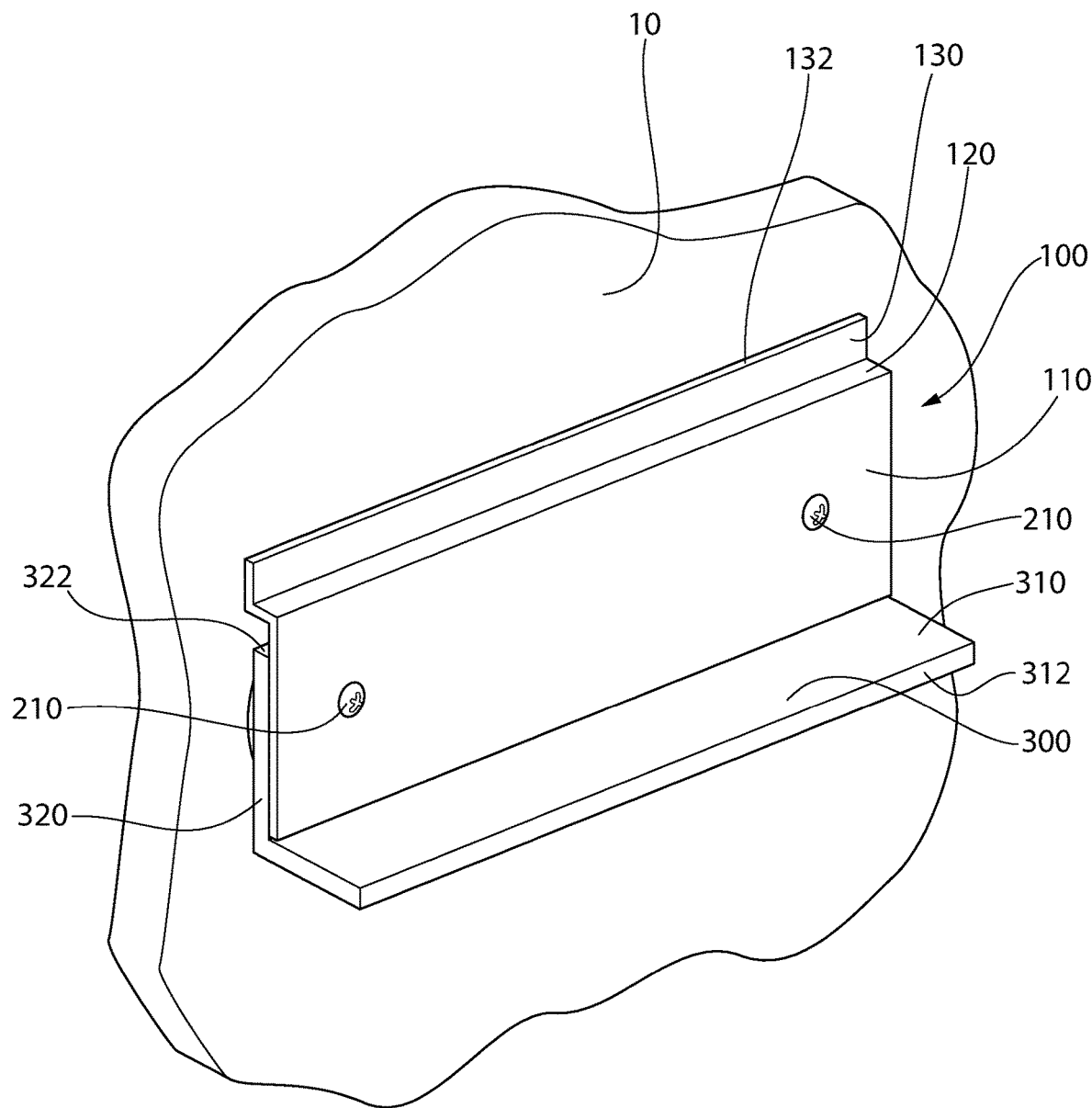
FIG. 1 is an upper perspective view of a mounting system with an accessory item in accordance with exemplary embodiments of the invention.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The following description of the preferred embodiment(s) is merely exemplary in nature and is in no way intended to limit the invention, its application, or uses.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "connected," "coupled," "interconnected," and similar refer to a relationship wherein structures are secured or attached to one another either directly or indirectly through intervening structures, as well as both movable or rigid attachments or relationships, unless expressly described otherwise. The term "fixed" refers to two structures that cannot be separated without damaging one of the structures. The term "filled" refers to a state that includes completely filled or partially filled.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

As stated above, a mounting system according to the present disclosure provides an esthetically pleasing and secure anchoring system for attaching an item to a hollow wall. In addition, the system provides a cover that blocks the top of an opening that can exists between other fastening systems and the wall to which the system is attached. This opening, if not covered, can allow foreign material (such as food in a kitchen) to enter the space between the system and the wall. Such foreign material can be unsightly and/or difficult to remove.

FIG. 1 shows an example of a fastening system in accordance with an embodiment of the invention in an assembled state. In this example, the fastening system includes a cover 100 that covers a mountable accessory object or item, in this non-limiting case a shelf 300, that is fastened to wall 10 by fasteners 200 (represented in this figure by fastener heads 210). The cover 100 and shelf 300 may be horizontally elongated in one embodiment.

Figure 3:
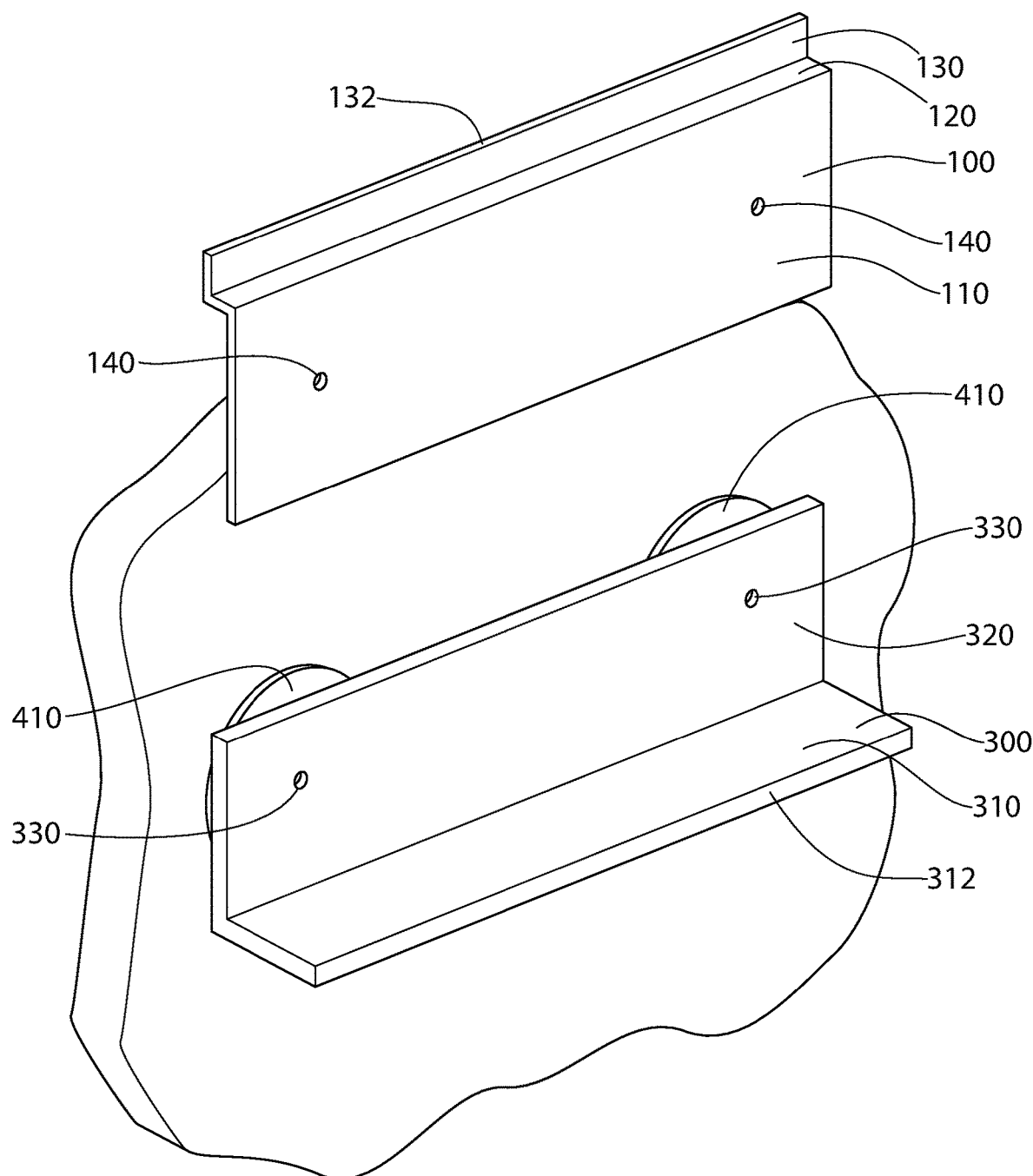
FIG. 3 is an upper perspective view of the mounting system of FIG. 1 in an unassembled state.

FIG. 3 shows the system of FIG. 1 in a partially disassembled state. FIG. 3 shows shelf 300 and force-distributing plates 410 in position on wall 10, but with cover 100 removed. If this system were to be installed without cover 100, force-distributing plates 410 would be visible, which can be esthetically undesirable. Cover 100 provides an esthetically pleasing solution by covering force-distributing plates 410 and an upper edge 322 (e.g. horizontal) of shelf 300.

Cover 100 has a first section 110 that, in this example, extends vertically parallel to an outer surface of wall 10. First section 110 defines a planar rear surface 902 and opposing parallel planar front surface 903. A second section 130 extends, in this example, parallel to first section 110 and is configured to press against the outer surface of wall 10. Second section defines a planar rear surface 906 and opposing parallel planar front surface 901. Each section 110, 130 has a greater height/width than their respective thickness formed by the bent plate or welded construction. A planar ledge 120 extends, in this example horizontally, between first section 110 and second section 130. Second section 130 has an upper edge 132 that, in this example, extends horizontally. In other examples, edge 132 can be radiused, angled, or of some other shape that is esthetically pleasing and/or satisfies another purpose. Cover 100 has two holes 140 through which fasteners can extend. Although two holes 140 are shown in this example, it is noted that fewer or more fasteners can be used and, as a result, fewer or more holes 140 can be provided.

Shelf 300 has, in this example, a first section 310 that extends horizontally perpendicular to the exposed flat surface or face of wall 10, and a second section 320 that extends vertically parallel to the face of wall 10 and perpendicular to the first section. Each section 310, 320 has a greater height/width than their respective thickness formed by the bent plate or welded construction. First section 310 has a front edge 312 that, in this example, extends horizontally and is vertically flat. In other examples, edge 312 can be radiused, angled, or of some other shape that is esthetically pleasing and/or satisfies another purpose. Two holes 330 are provided in second section 320 through which fasteners can extend. Although two holes 330 are shown in this example, it is noted that fewer or more fasteners can be used and, as a result, fewer or more holes 330 can be provided. Because the same fasteners are used to fasten shelf 300 and cover 100 to wall 10, holes 330 correspond in location and number to holes 140 which become concentrically aligned when the shelf and cover are assembled.

Shelf 300, force-distributing plates 410, and cover 100 can be formed of the same or different suitable metals such as, for example, stainless steel, aluminum, titanium, or other. Non-metallic materials such as plastics or any other suitable material may be used for these components provided they have sufficient strength and rigidity.

Two force-distributing plates 410 are shown in FIG. 3. Force-distributing plates 410 (discussed in more detail below) distribute the force exerted on the face of wall 10 by the fasteners so that the fasteners are not pulled though wall 10 or otherwise deform the outer surface of wall 10. FIG. 3 illustrates how force-distributing plates 410 can extend beyond (above in this example) the limits of second section 320 of shelf 300 (e.g. above horizontal top edge 322 of second section 320). This can produce an undesirable visual effect. As can be seen in FIG. 1, cover 100 hides force-distributing plates 410 to produce a more visually pleasing result. Cover 100 also covers a gap between second section 320 and the outer surface of wall 10 caused by force-distributing plates 410 (shown in more detail below).

It will be appreciated that in other possible constructions, force-distributing plates 410 may have a height which is less than or flush with the top edge 322 of shelf 300. This situation would still create an esthetically displeasing appearance and gap between the wall and shelf which could also benefit from the use of cover 100 to conceal the force-distributing plates and at least partially cover the gap.

Figure 2:
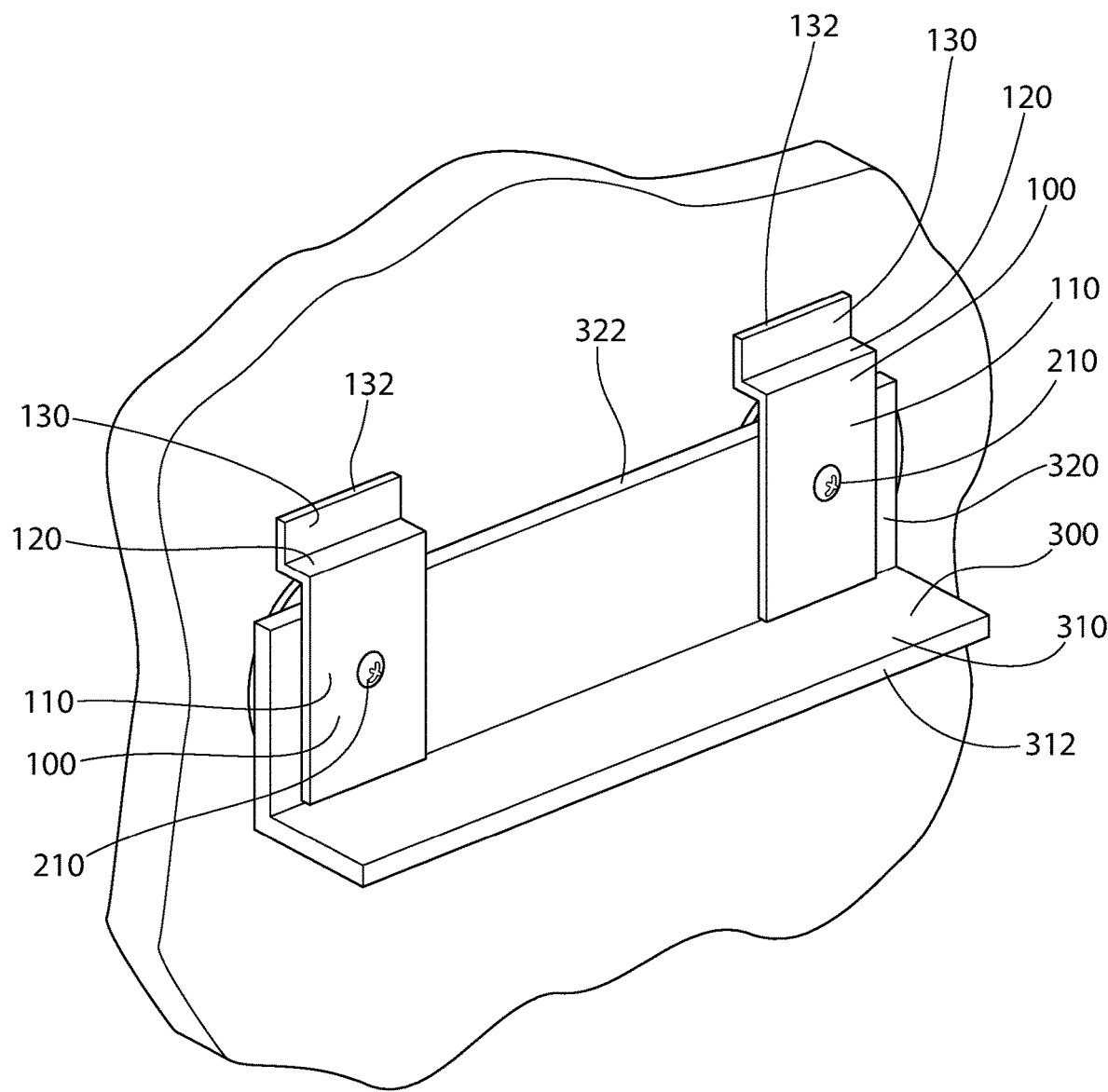
FIG. 2 is an upper perspective view of a mounting system in accordance with exemplary embodiments of the invention.

FIG. 2 shows another embodiment of the invention that is similar to the embodiment shown in FIG. 1, except that two covers 100 are used instead of one. This embodiment covers force-distributing plates 410 but gives a different visual appearance than the embodiment shown in FIG. 1 such that portions of the section 320 of shelf 300 remain visible, whereas in FIG. 1 the single cover 100 has a horizontal length coextensive with the shelf and conceals the entirety of the section 320. This present embodiment of FIG. 2 also exposes part of the gap between second section 320 of shelf 300 and the outer surface of wall 10 and, as a result, allows an accessory (such as, for example, a condiment rack) to be hung over the top horizontal edge 322 of the shelf.

Force-distributing plates 410 are generally flat or planar broadened structures in the general form of a washer with a width/height greater than their thickness. Force-distributing plates 410 and may have any suitable shape. In one embodiment, the plates 410 may be circular as depicted. Other non-polygonal shapes and polygonal shapes including rectilinear shapes (e.g. square or rectangular) may be used. The invention is thus not restricted by the shape of the force-distributing plates.

Figure 4:
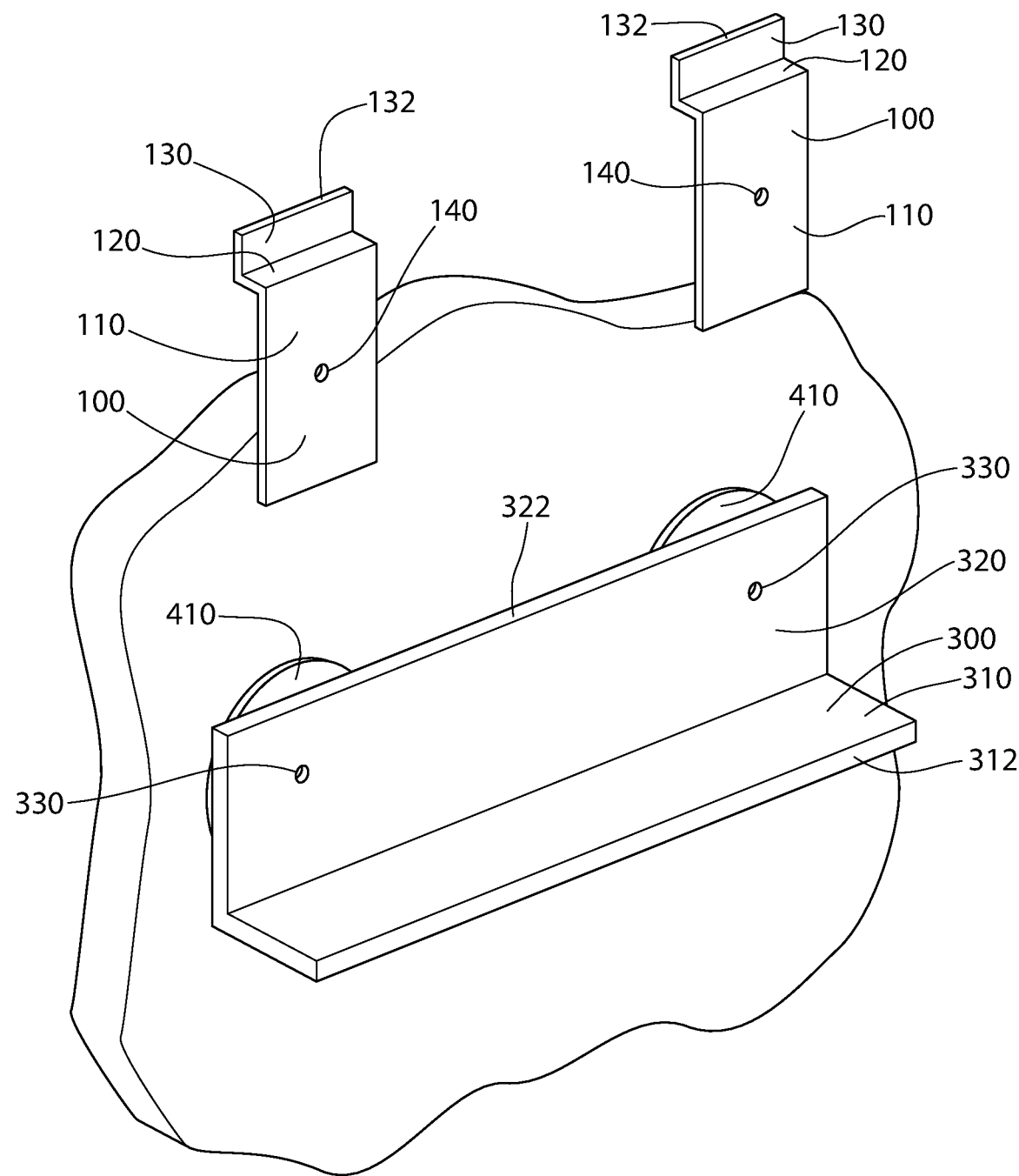
FIG. 4 is an upper perspective view of the mounting system of FIG. 2 in an unassembled state.

FIG. 4 shows the example shown in FIG. 2 in a partially disassembled state. FIG. 4 shows shelf 300 and force-distributing plates 410 in position on wall 10, but with covers 100 removed. If this system were to be installed without covers 100, force-distributing plates 410 would be visible, which can be esthetically undesirable. Covers 100 provide an esthetically pleasing solution by covering force-distributing plates 410, while leaving a portion of edge 322 of shelf 300 exposed.

Figure 5:
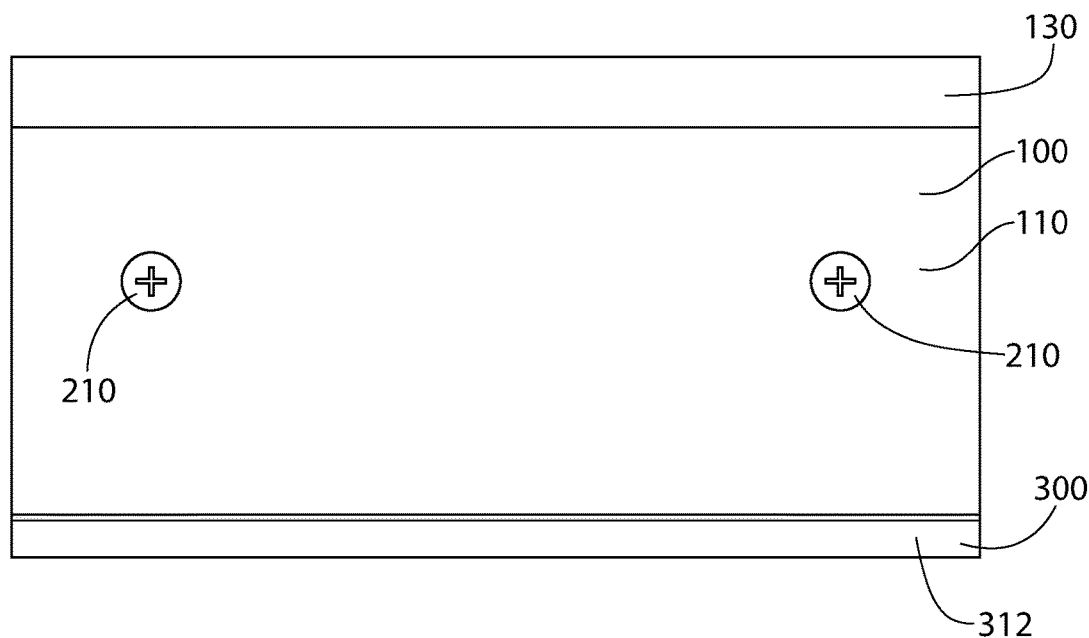
FIG. 5 is a front view of the mounting system of FIG. 1.

FIG. 5 is a front view of the embodiment shown in FIG. 1. In this example, fastener heads 210 are shown as Phillip's head bolts. However, any suitable head or engagement portion can be used, such as, for example, an external hex head, an internal hex head, or a slotted head. However, in some embodiments, a smooth, rounded fastener head is desirable in order to removably engage a slot in an accessory that is used with the system (discussed below).

Figure 6:
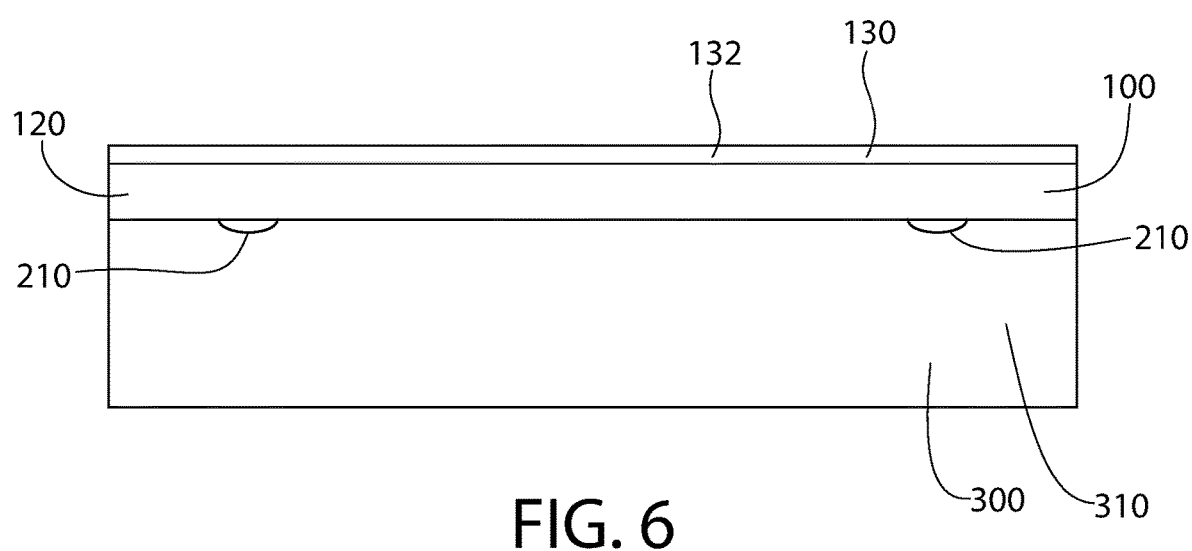
FIG. 6 is top view of the mounting system of FIG. 1.

FIG. 6 is a top view of the embodiment shown in FIG. 1. In this example fastener heads 210 are rounded in order to removably engage a slot in an accessory that is used with the system (discussed below).

Figure 7:
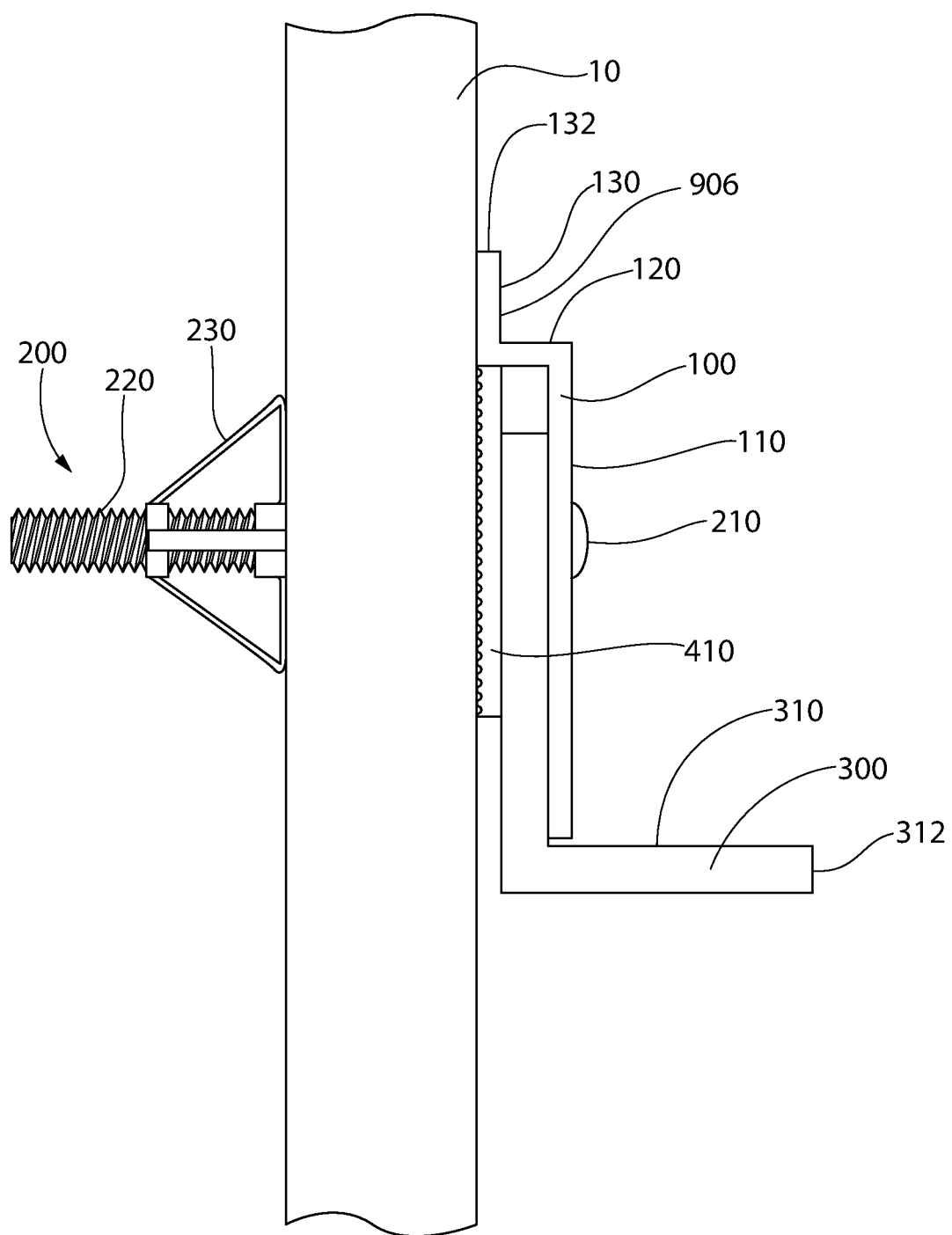
FIG. 7 is a side view of the mounting system of FIG. 1 in an installed state.
Figure 8:
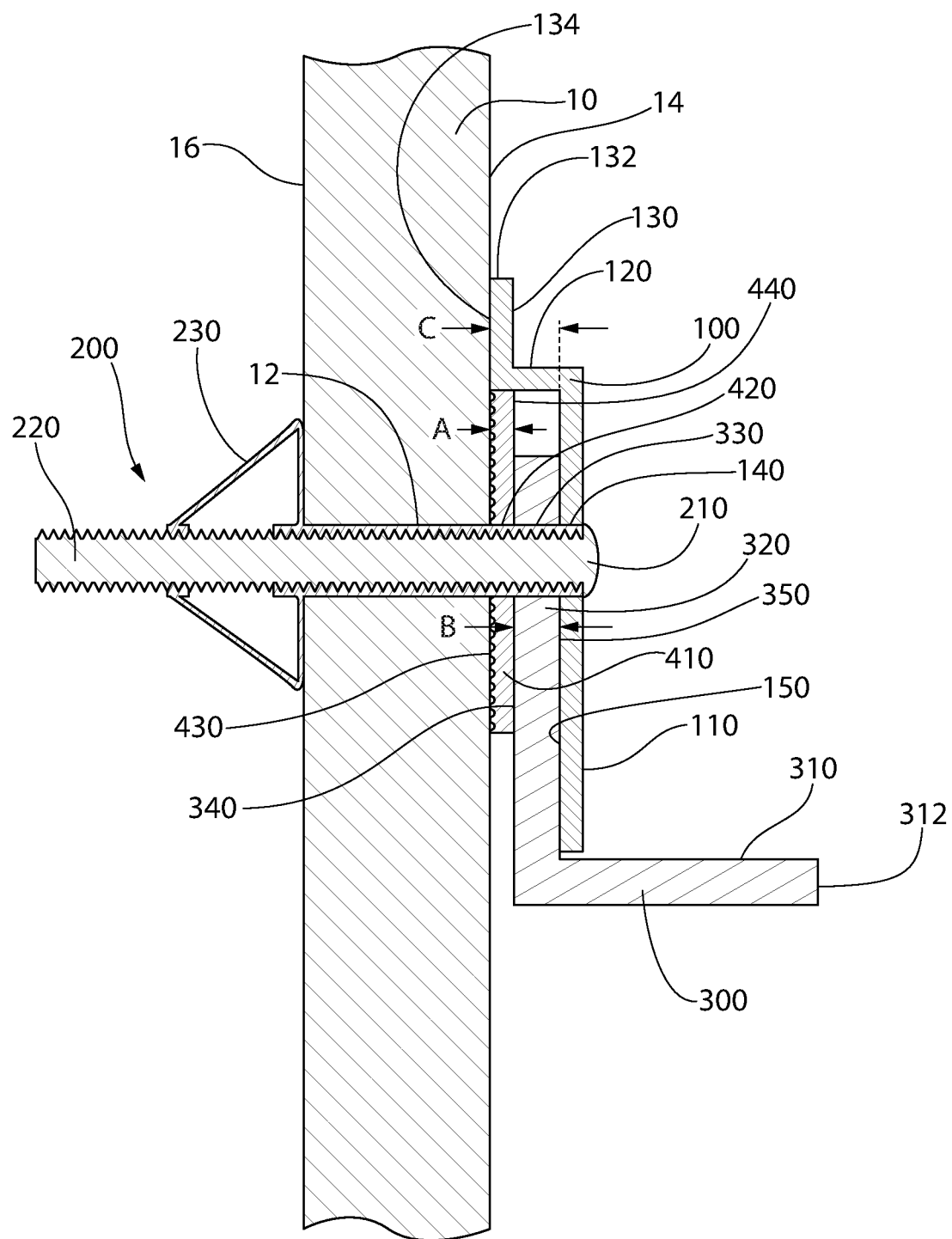
FIG. 8 is a side sectional view of the mounting system of FIG. 1 in an installed state.

In FIGS. 7 and 8 the example of FIG. 1 is shown mounted to wall 10. A method for fastening the item (e.g. shelf 300 or other) to the wall will now be briefly summarized. It bears noting the method and these figures also apply to the example shown in FIG. 2 using two force-distributing plates 410. In these figures, fastener 200 has a head 210, a threaded shaft 220 and an expansion element or part 230 (e.g. expansion anchor) for use with a hollow wall that generally comprises two or more deformable triangular shaped arms in one embodiment as shown. Such expansion parts 230 or anchors are coupled to the shaft of fastener 200, and are well known in the art and commercially available. Other types of expansion anchors/parts may be used and does not limit the invention.

Starting with expansion part 230 in an unexpanded state, threaded shaft 220 and expansion part 230 of fastener 200 are inserted (in order) through hole 140 in cover 100, hole 330 in shelf 300, a hole 420 in force-distributing plate 410, and a pre-drilled hole 12 in hollow wall 10; the holes being all concentrically aligned with each other. If the holes in the cover, shelf, and force-distributing plate are not large enough in diameter to pass the expansion part 230 therethrough, the threaded shaft 220 of fastener 200 may alone be passed through those three holes and the expansion part may be then threaded or inserted over the shaft before inserting the shaft and expansion part through the hole 10 pre-drilled in the hollow wall 10. Either assembly scenario is acceptable.

The diametrically enlarged head 210 of fastener 200 prevents fastener 200 from passing all the way through first section 110 of cover 100. Head 210 is engaged by a turning tool (e g manual screwdriver or electric drill/driver) and turned to rotate threaded shaft 220, which causes expansion part 230 to expand outward and press against an inner face 16 of wall 10 as the fastener is tightened and the shaft advances through the wall. This secures the shelf 300 assembly to the wall in rigid manner.

As can be seen from FIGS. 7 and 8, a planar rear surface or face 430 of force-distributing plate 410 is pressed against and abuttingly engages the planar outer surface or face 14 of wall 10 when the assembly is fastened to wall 10. A planar surface or rear face 340 of second section 320 of shelf 300 is pressed against a planar front surface or face 440 of force-distributing plate 410 in this assembled state. Also, a planar rear surface or face 150 of first section 110 of cover 100 is pressed against a planar front surface or face 350 of second section 320 of shelf 300 while a planar rear surface or face 134 of second section 130 of cover 100 is pressed against planar outer surface or face 14 of wall 10. The front surface or face 906 is exposed. As can be seen from FIGS. 7 and 8, in this example, the sum of a thicknesses A of force-distributing plate 410 and a thickness B of second portion 320 of shelf 300 equals a length C of ledge 120 so that rear face 134 of second section 130 of cover 100 and rear face 430 of force-distributing plate 410 are co-planar. This configuration results in the compressive fastening force being exerted on the outer surface of wall 10 via tightening fastener 200 by both the second section 130 and force-distributing plate 410, and that force being substantially equal. The force-distributing plate 410 and cover both advantageously distribute the force over a collectively larger surface area of the wall to prevent damaging the wall yet provide a secure mount.

In other embodiments, the dimensions of one or more parts can be altered so that rear face 134 of second section 130 and rear face 430 of force-distributing plate 410 are not co-planar. For example, it may be desirable for the sum of thicknesses A and B be slightly more than length C so that rear face 134 of second portion 130 barely rests against outer face 14 of wall 10 while rear face 430 of force-distributing plate 410 slightly depresses outer face 14 of wall 10. This can be desirable when the system is mounted to a particularly delicate wall surface so that no depression of the wall surface is visible when the system is in the installed state. In another example, it may be desirable for the sum of thicknesses A and B be slightly less than length C so that rear face 134 of second portion 130 depresses outer face 14 of wall 10 more than rear face 430 of force-distributing plate 410 depresses outer face 14 of wall 10. This can be desirable when it is particularly important that nothing can fall between upper ledge 132 and wall 10.

Figure 9:
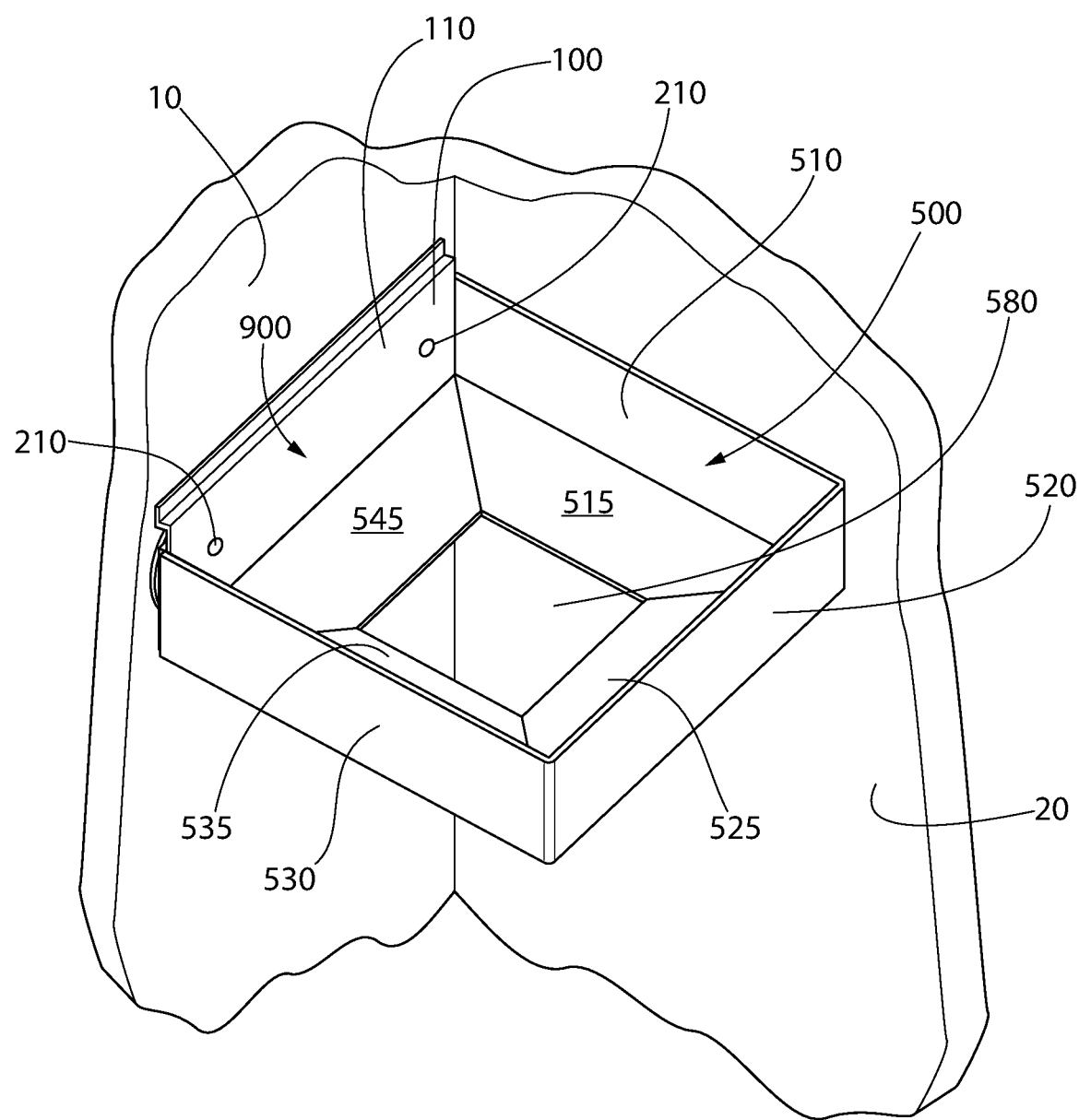
FIG. 9 is an upper perspective view of a mounting system with a perimeter frame support structure for supporting an accessory in accordance with exemplary embodiments of the invention.
Figure 10:
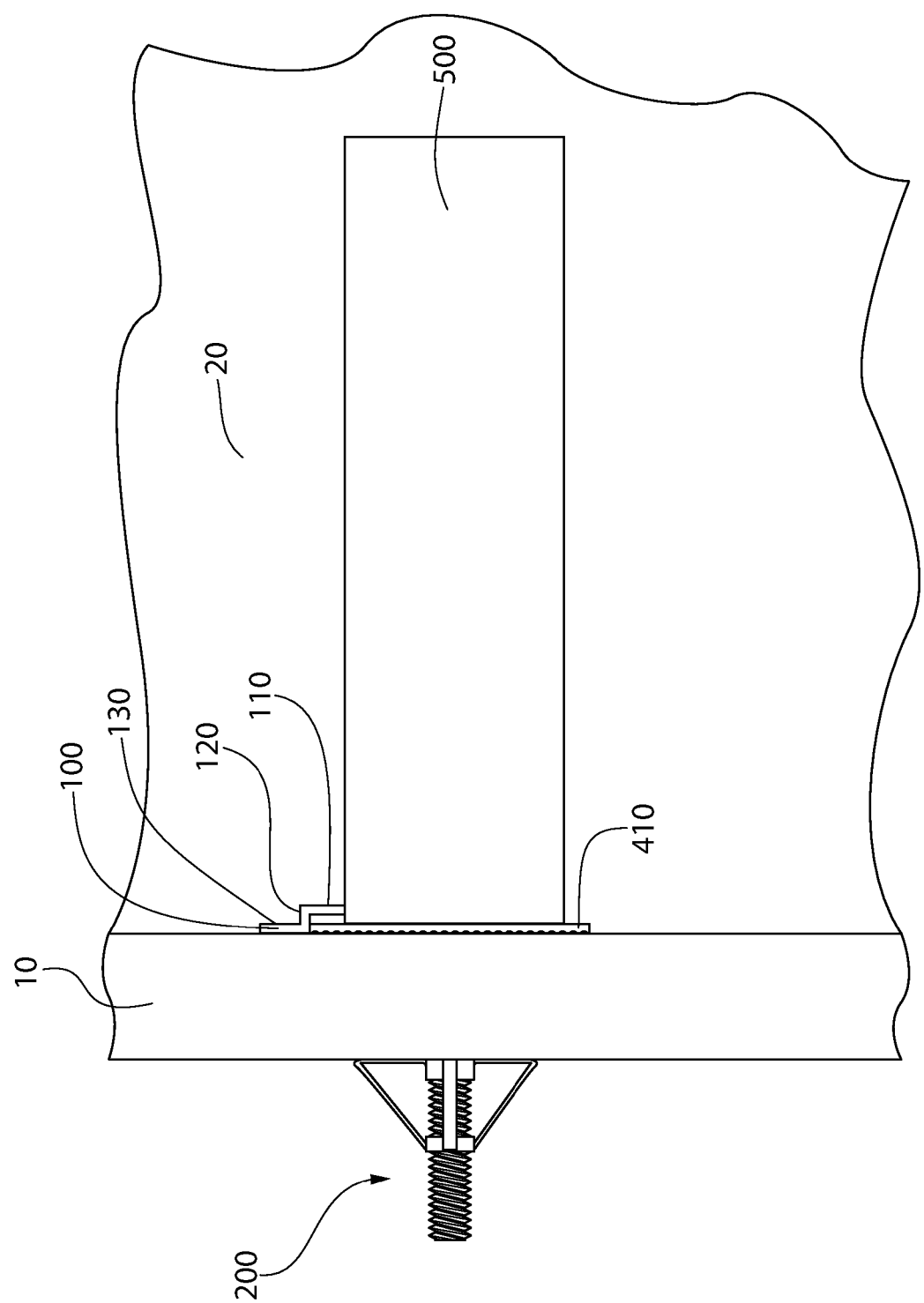
FIG. 10 is a side view of the mounting system and support of FIG. 9 in an installed state.
Figure 11:
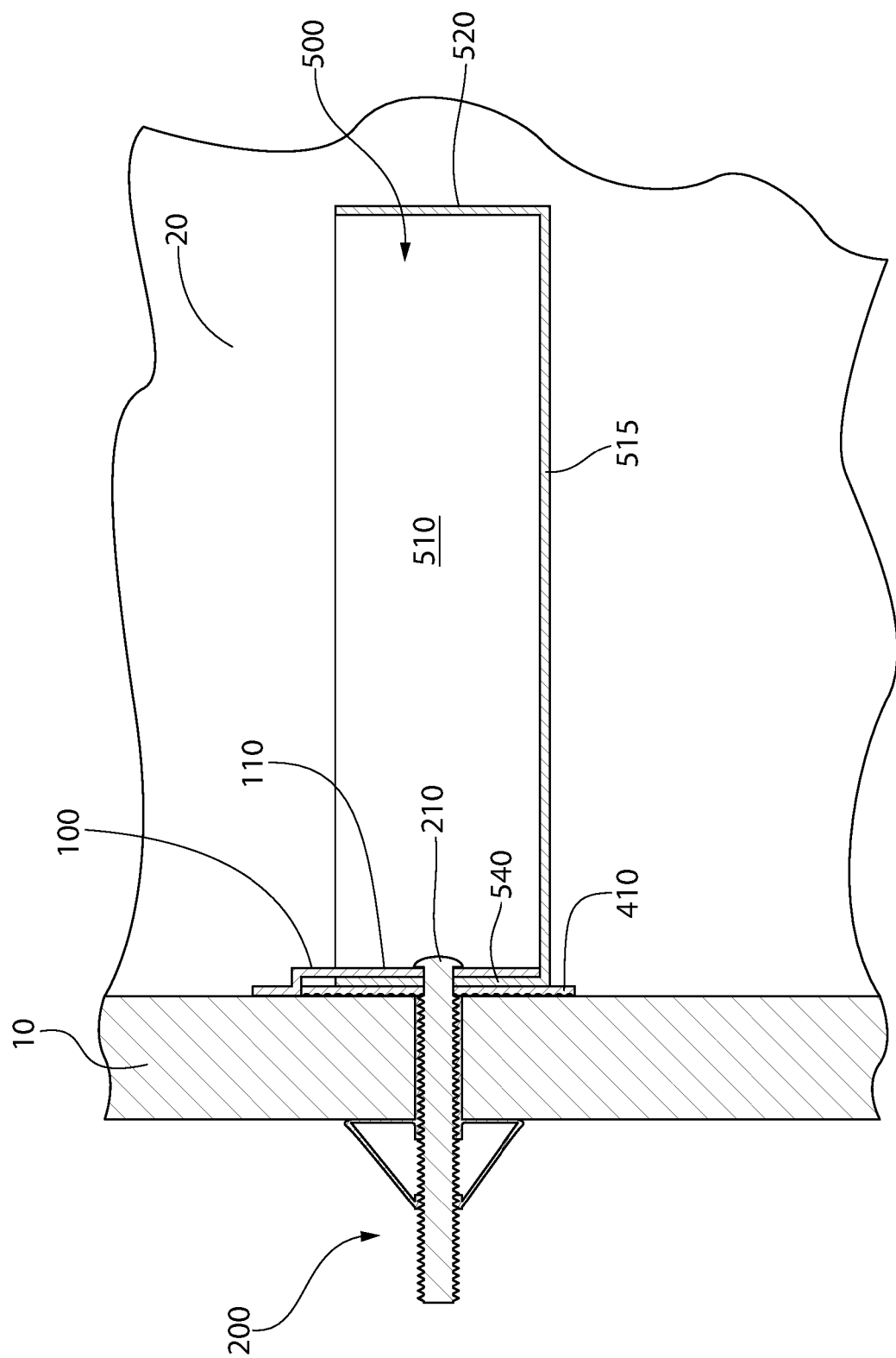
FIG. 11 is a side sectional view of the mounting system and support of FIG. 9 in an installed state.

FIGS. 9-11 show an embodiment of a fastening or mounting system comprising an accessory support structure 500 in the form of a perimeter frame with optionally open, partially open, or fully closed bottoms which can be fastened to wall 10. The perimeter frame support structure 500 may be mounted directly to the wall 10 with fasteners 200, or alternatively may utilize the wall mounting system assembly previously described herein with respect to FIGS. 1-8 including the force-distributing plate 410 and cover 100 to fasten the support structure 500 to wall 10 in a cantilevered manner. Support structure 500 may be used to support various interchangeable items or accessories such as, for example, shelves, soap dispensers, racks, light fixtures, or any other accessory in a cantilevered manner.

It bears noting that although the perimeter frame support structure 500 is shown as having a generally square shape in FIGS. 9-11, in other embodiments the perimeter frame may be elongated having a rectangular shape with two long front/rear sides and shorter lateral left/right sides. The support structure 500 may have any length and projection from the wall depending on the particular intended use of the support structure.

Perimeter 300, force-distributing plates 410, and cover 100 can be formed of the same or different suitable metals such as, for example, stainless steel, aluminum, titanium, or other. Non-metallic materials such as plastics or any other suitable material may be used for these components provided they have sufficient strength and rigidity.

In this example, support structure 500 has a rectilinear frame-like structure generally formed by four intersecting vertically-oriented side elements or members 510, 520, 530, 540 (also referred to herein as "sides" for brevity). Side 510 includes a horizontal portion 515 extending from side 510 toward a central opening 580 of support structure 500. Side 520 includes a horizontal portion 525 extending from side 520 toward opening 580. Side 530 includes a horizontal portion 535 extending from side 530 toward opening 580. Side 540 includes a horizontal portion 545 extending from side 540 toward opening 580. The horizontal portions thus define the opening 580. The vertical portions of sides 510-540 may be arranged to create the rectilinear perimeter frame configuration forming perpendicular corners between each pair of the intersecting and adjacent sides. In this example, the foregoing horizontal portions are intersecting such that the diagonal edges of the horizontal portions contact the diagonal edges of the adjacent horizontal portions to create continuous shelf around opening 580. The diagonal edges may be welded together in one embodiment. In other examples, the diagonal edges of the horizontal portions do not contact the diagonal edges of the adjacent horizontal portions. In yet other examples, the horizontal portions converge in the central area of support 500 such that no opening 580 exists.

In this example shown in FIGS. 9-12, side 510 of the perimeter frame contacts wall 20 but is not fastened to wall 20 which meets wall 10 at a corner. This represents a corner mounting situation of the support structure 500. In other examples, side 520 may be fastened to wall 20 in the same manner that side 540 is fastened to wall 10 using force-distributing plates 410 and covers 100. This provides two sides and places of support for the perimeter frame to hold the weight of heavy objects supported by the frame. In other examples, the perimeter frame may be attached to a section of wall 10 or 20 not adjacent a corner such that side 510 does not contact wall 20. In this situation, the perimeter frame is supported in an entirely cantilevered manner.

FIG. 11 shows in sectional view that support structure 500 is fastened to wall 10 in the same manner that shelf 300 is fastened to wall 10 in FIG. 8.

Figure 12:
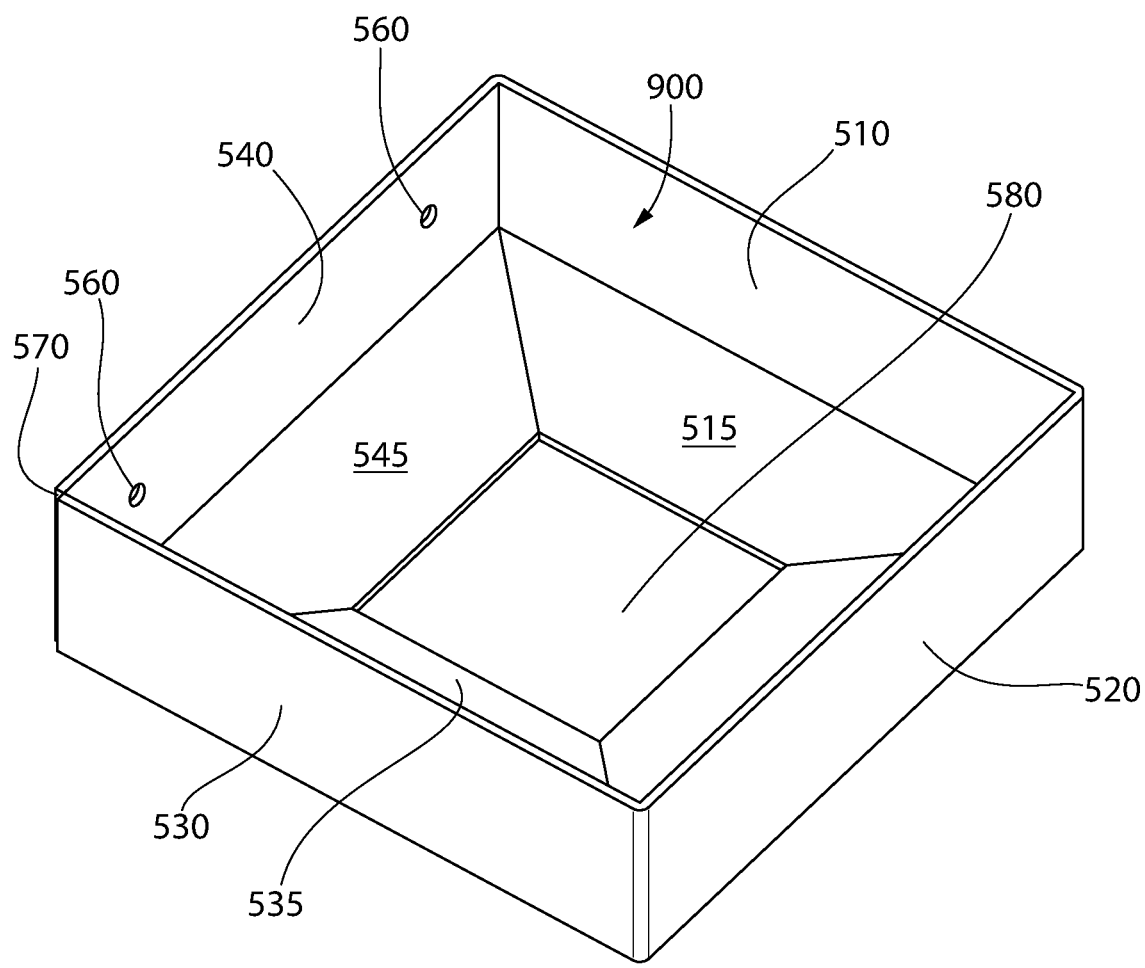
FIG. 12 is an upper perspective view of the support of FIG. 9.

FIG. 12 shows support structure 500 as having two holes 560 in side 540. Holes 560 serve the same purpose as holes 330 of shelf 300. Due to the fabrication method used in this example, a continuous corner exists between sides 540 and 510, between sides 510 and 520, and between sides 520 and 530. In contrast, a joint 570 exists between sides 530 and 540 (explained further below).

Figure 13:
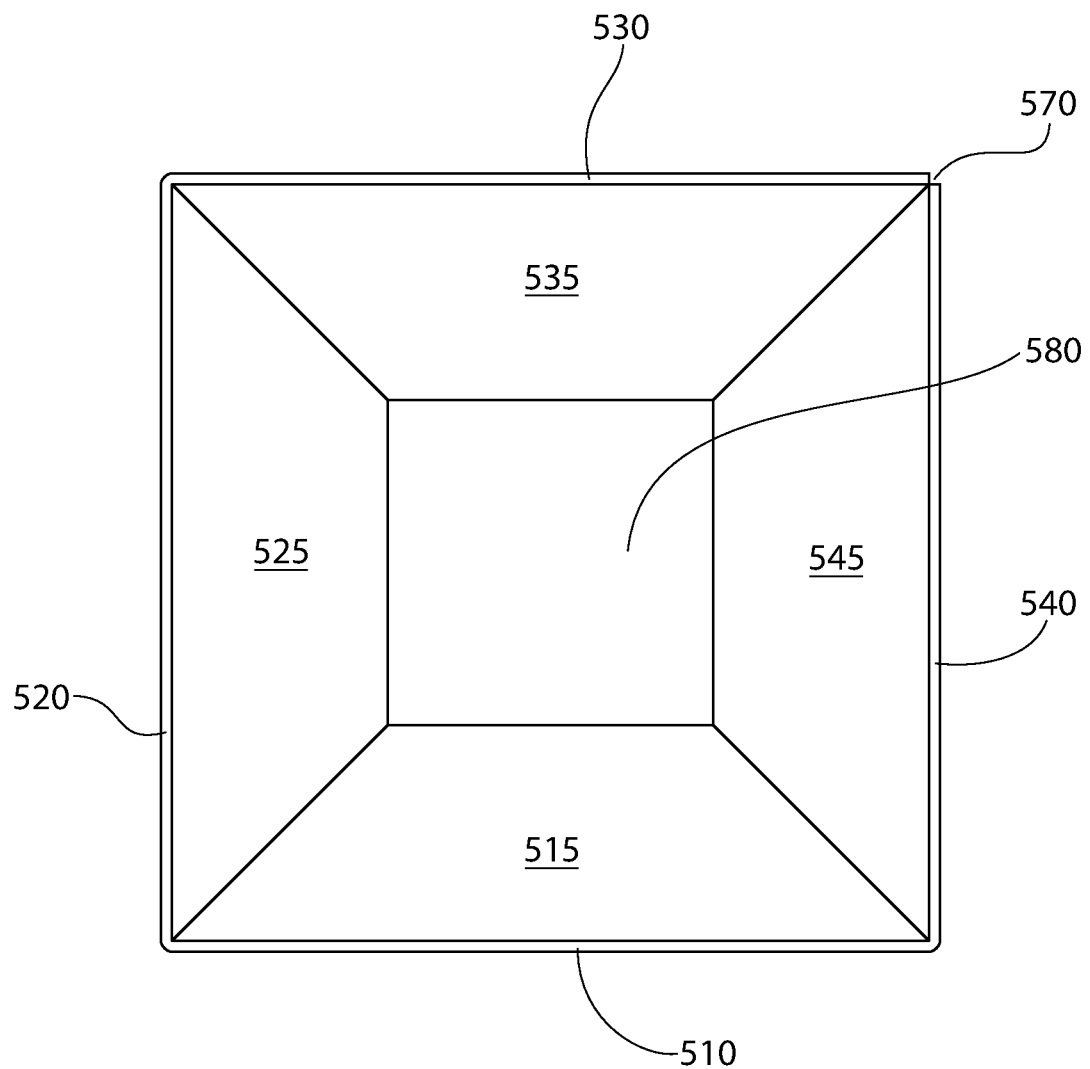
FIG. 13 is a top view of the support of FIG. 9.
Figure 14:
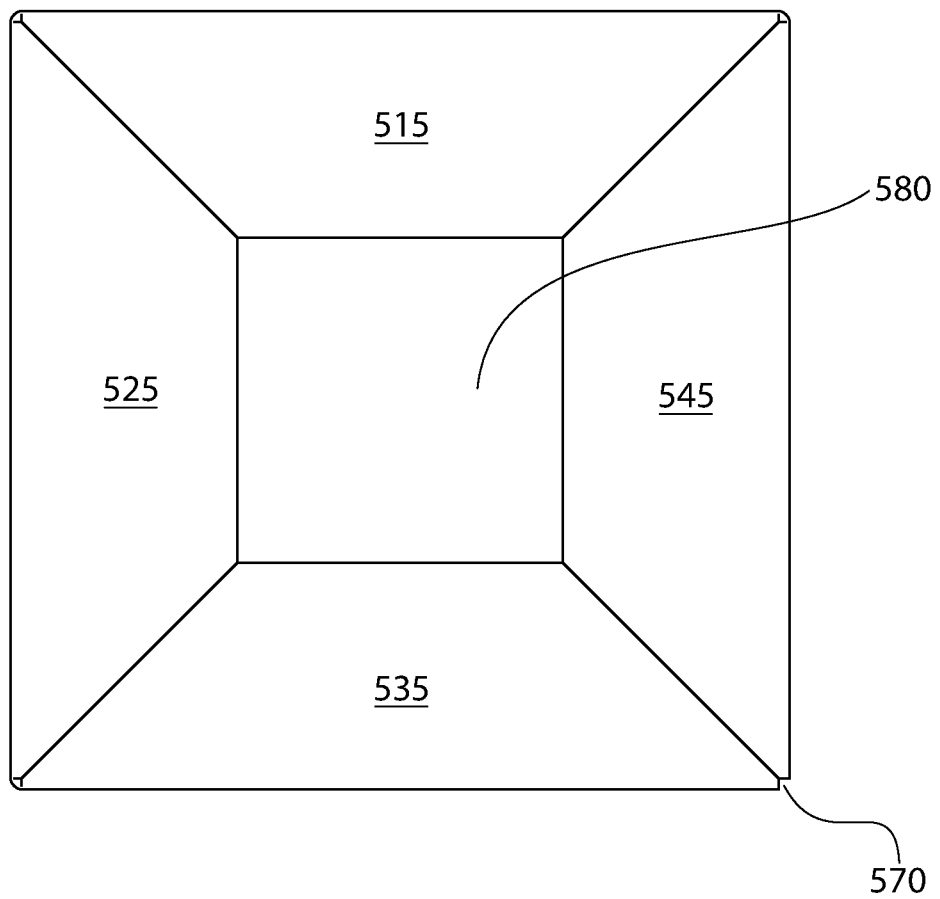
FIG. 14 is a bottom view of the support of FIG. 9.
Figure 15:
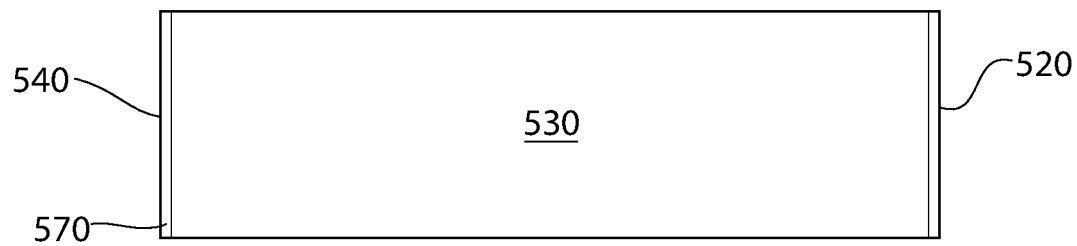
FIG. 15 is a side view of the support of FIG. 9.

FIG. 13 is a top view of support structure 500 and shows opening 580 and joint 570. FIG. 14 is a bottom view of support structure 500 and shows opening 580 and joint 570. FIG. 15 is a side view of support structure 500 and also shows joint 570.

Figure 16:
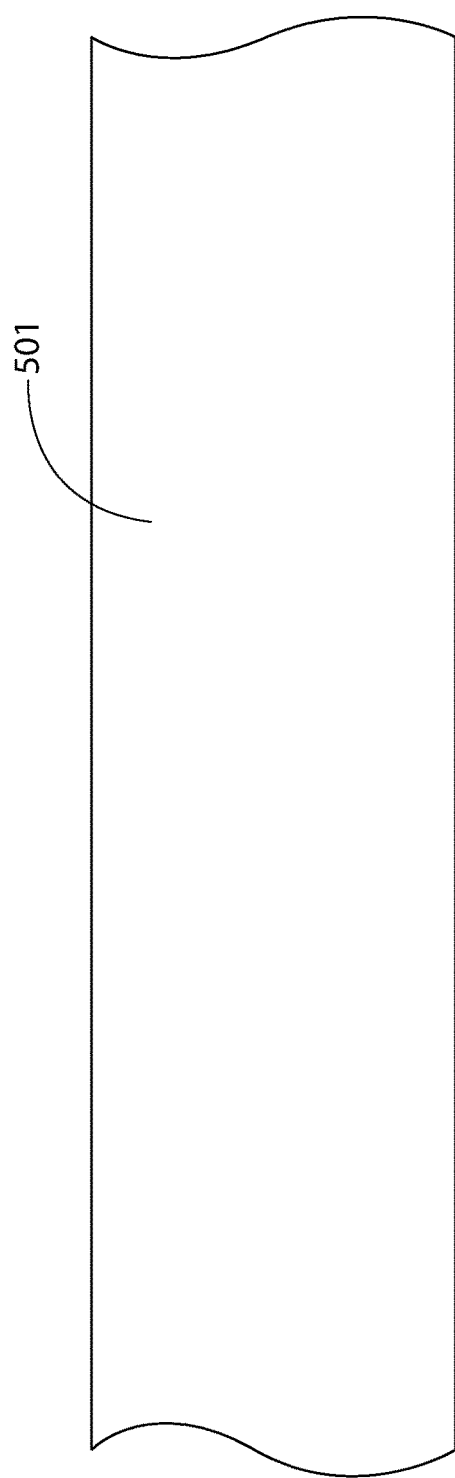
FIG. 16 is a production or workpiece blank used to fabricate the support of FIG. 9 prior to cutting.
Figure 17:
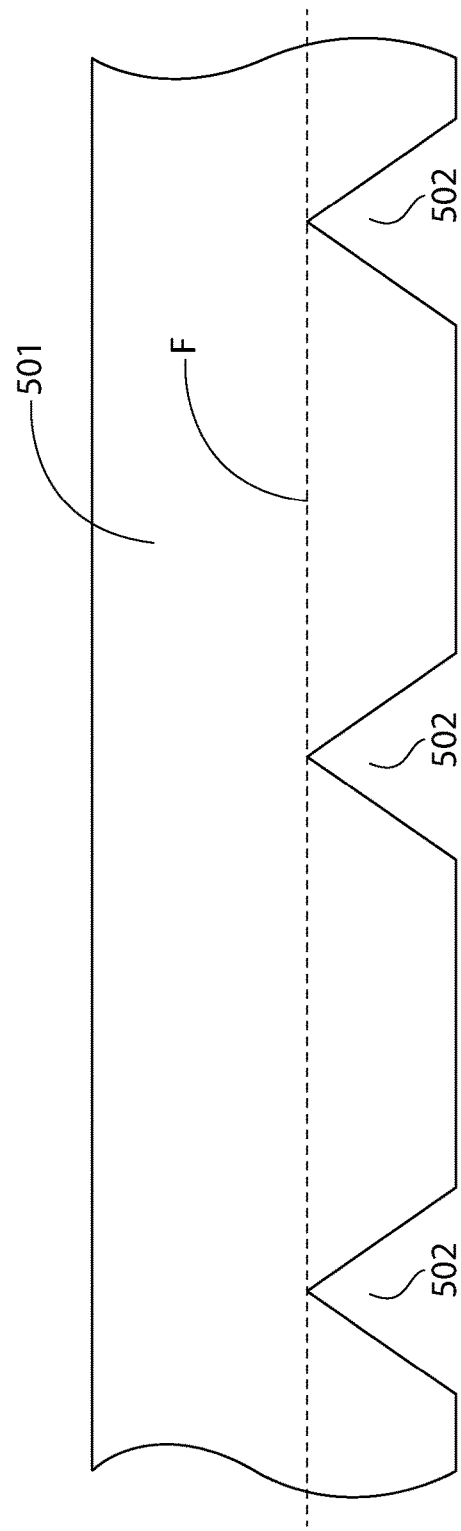
FIG. 17 is the production blank of FIG. 16 after being cut to shape to be used to fabricate the support of FIG. 9.

FIGS. 16 and 17 will be used to illustrate one fabrication method of support structure 500. In this method, a workpiece blank 501 can be a suitable metal such as, for example, stainless steel, aluminum, titanium, or other. Non-metallic materials such as plastics or any other suitable material may be used provided they have sufficient strength and rigidity. Blank 501 has sections cut out of it to form notches 502. The flaps resulting from the notches are folded, in this example, at a 90 degree angle along fold line F to form horizontal portions 515, 525, 535, 545. Ninety degree bends are than made along lines that are perpendicular to fold line F extending from the apex of each notch 502. These bends form the corners of support structure 500. The free ends of the resulting structure form joint 570. The edges along notches 502 (which now contact each other) can be welded together, joined in some other fashion, or simply left unjoined. Similarly, the free ends that come together as joint 570 can be welded together, joined in some other fashion, or simply left unjoined. In the case of unjoined edges or ends, the material from which support structure 500 is made can be sufficiently strong to not require joining.

Figure 18:
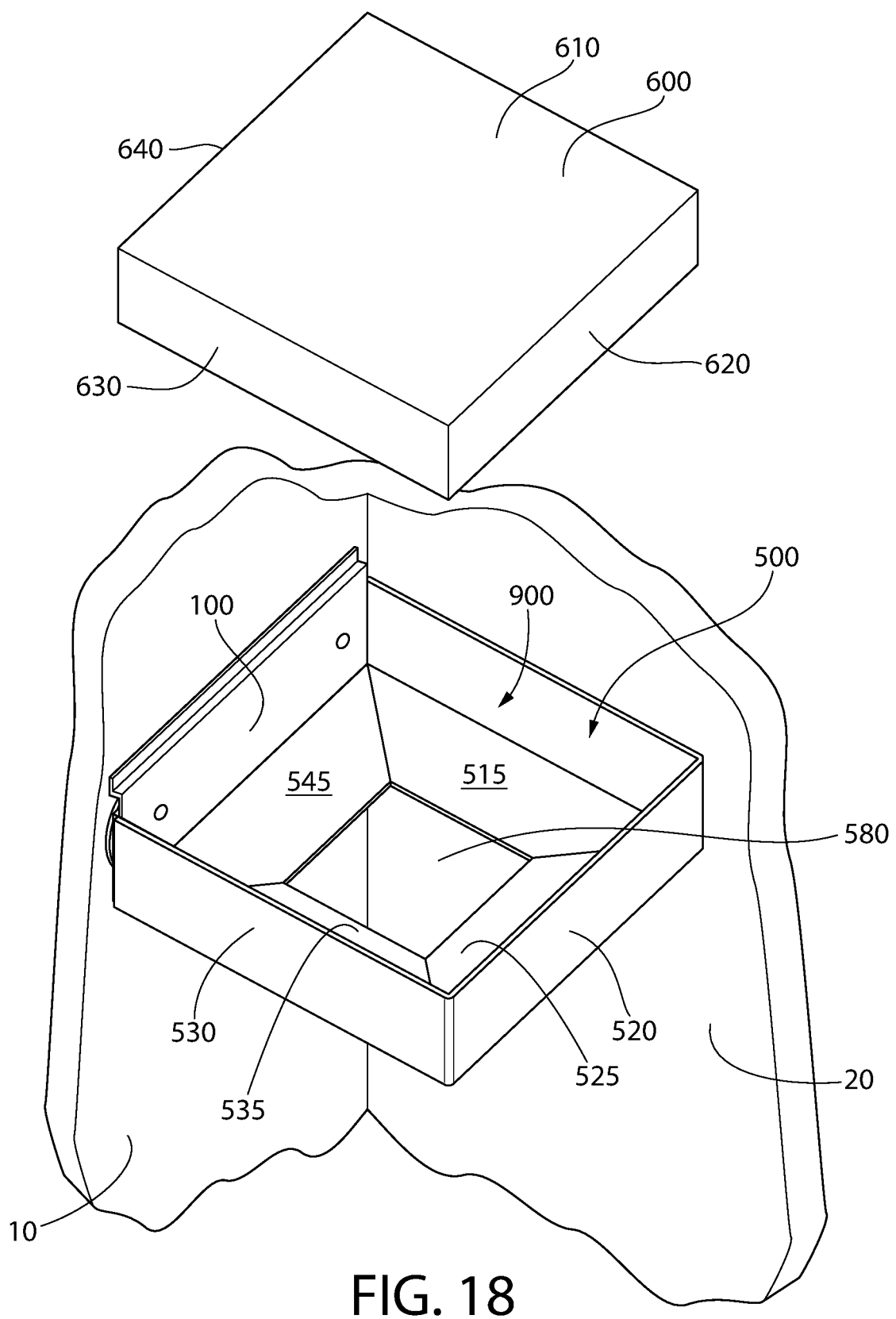
FIG. 18 is an exploded upper perspective view of a shelf unit and the mounting system and support of FIG. 9.
Figure 19:
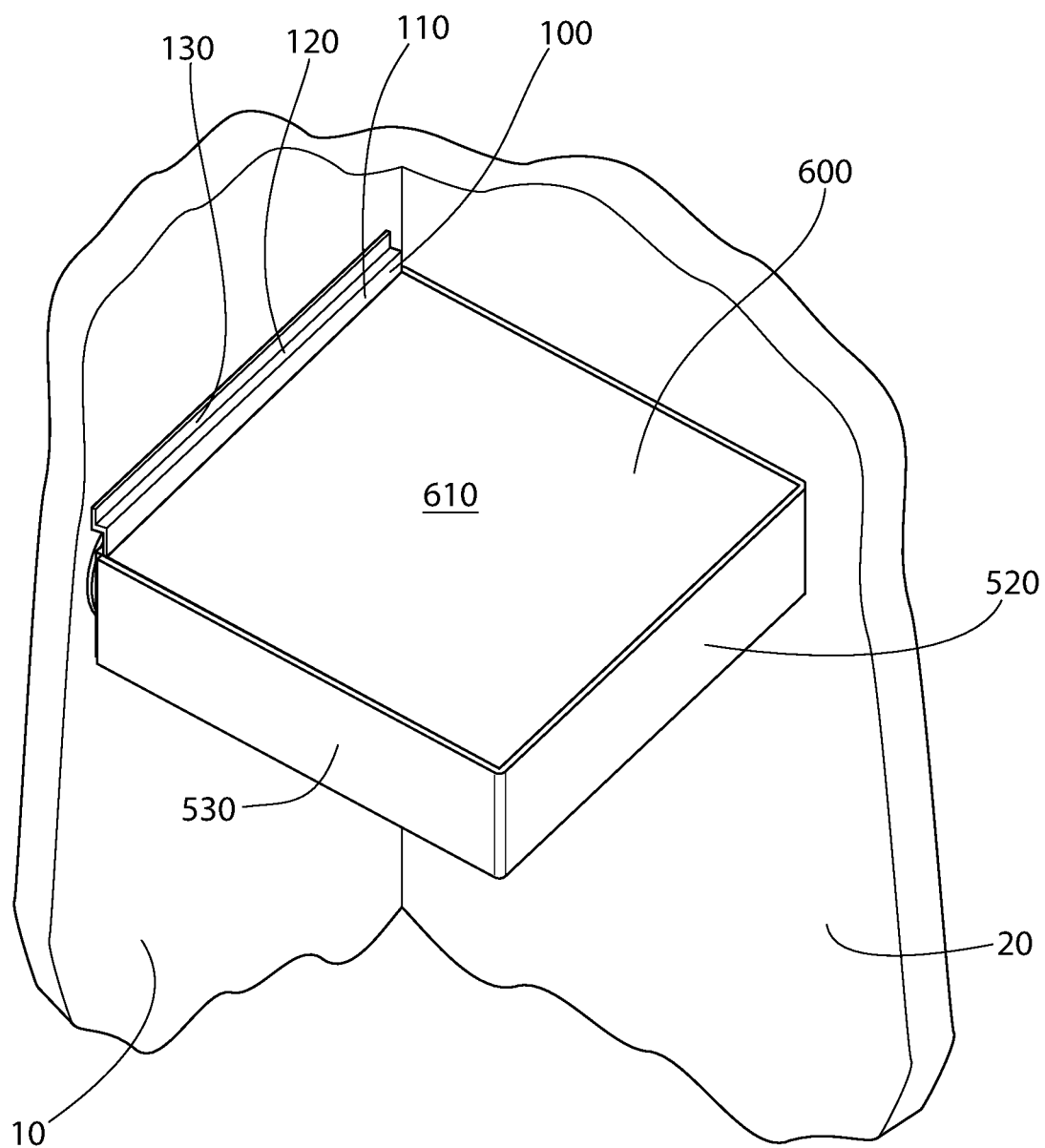
FIG. 19 is an upper perspective view of the shelf unit, mounting system, and support of FIG. 18 in an assembled state.

FIG. 18 shows a shelf insert 600 above support structure 500. FIG. 19 shows shelf insert 600 in an installed position in support structure 500. The perimeter frame support structure 500 defines an upwardly open receptacle 900 configured to receive at least a portion, or in some examples the entirety of shelf insert 600 therein (see also FIG. 9). Shelf insert 600 has a top surface 610, plurality of sides including opposing lateral right/left sides 620, and opposing front side 630 and rear side 640. In this example, shelf insert 600 slides into support structure 500 with a slight interference fit between its sides and sides 510, 520, 530, 540 until top surface 610 is substantially flush with the upper edges of sides 510, 520, 530, 540. In other embodiments, top surface 610 is above or below the upper edges of sides 510, 520, 530, 540.

Figure 20:
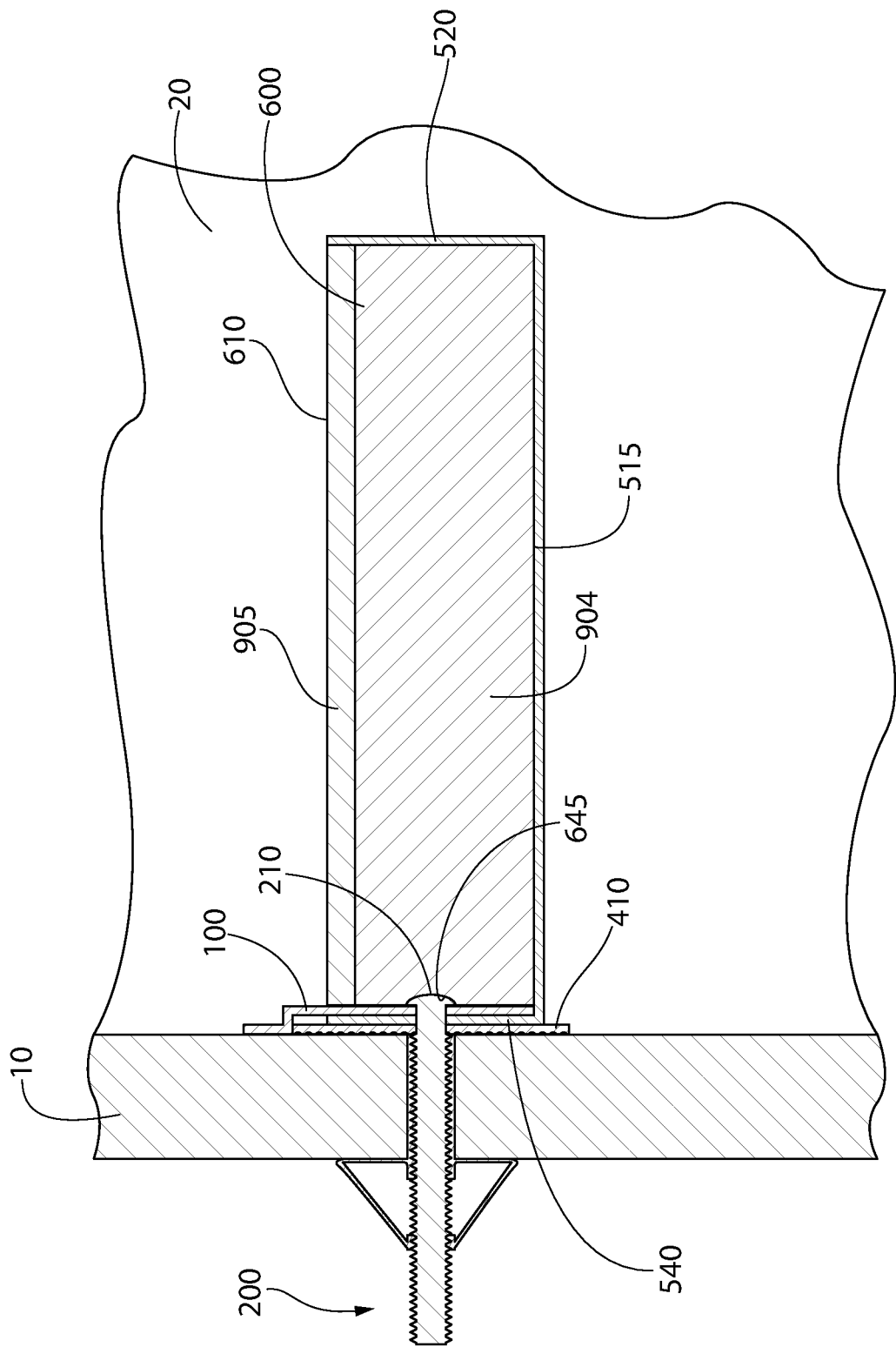
FIG. 20 is a side sectional view of the shelf unit and mounting system and support of FIG. 19.

FIG. 20 shows a side sectional view of shelf insert 600 in the installed position in support structure 500. In this example, shelf insert 600 has a groove 645 that runs horizontally along the side that contacts side 540 of support structure 500. Groove 645 is configured to accept heads 210 of fasteners 200 and can provide a locking feature that is not permanent. Shelf insert 600 is, in this example, pressed into support structure 500 until heads 210 engage groove 645, locking shelf insert 600 into place. Shelf insert 600 can then be removed by pushing it upward to disengage heads 210 from groove 645. Access to the bottom of shelf insert 600 is available through opening 580 (see FIG. 22). In other examples, individual indentations are provided for each head 210 instead of a single groove 645 that receives all heads 210.

Shelf insert 600 may be made of any suitable material, including for example without limitation wood, marble, plastics, synthetic materials, glass, or others. In some embodiments, shelf insert may have a composite construction formed of two or more materials laminated or adhesively glued together as shown in FIG. 20. The shelf insert depicted includes a veneered decorative top portion layer 905 of suitable thickness and a bottom core portion or layer 904 which formed of a different material than the veneer layer. Top layer 905 is substantially thinner in thickness than the core layer 904 which supported the decorative layer. Advantageously, this construction allows a less expensive but strong core layer 904 to be used for supporting objects placed on the shelf insert 600 which may not be so aesthetically pleasing (e.g. plywood, MDF, particle board, etc.), whereas the decorative top layer 905, which is exposed and visible to room occupants, can be esthetically pleasing (e.g. hardwood veneers, stone or marble veneers, synthetic veneers with decorative patterns, etc.). This construction is possible in the present embodiment because the core layer 904 is fully inserted inside the perimeter frame support structure 500 and not visible to the occupants. The cost of the shelf insert 600 using the foregoing composite construction can be significantly reduced.

As shown in FIG. 20, the top surface 610 defined by veneered decorative top layer 905 may be substantially flush with the top edges of the perimeter frame (i.e. side members 510-540). Only the top surface 610 is thus visible after assembling the shelf insert 600 into the perimeter frame. In other variations, an upper side portion of the top layer 905 may extend above the top edges of the perimeter frame such that the top surface 610 is raised above the top edges of the perimeter frame.

Figure 21:
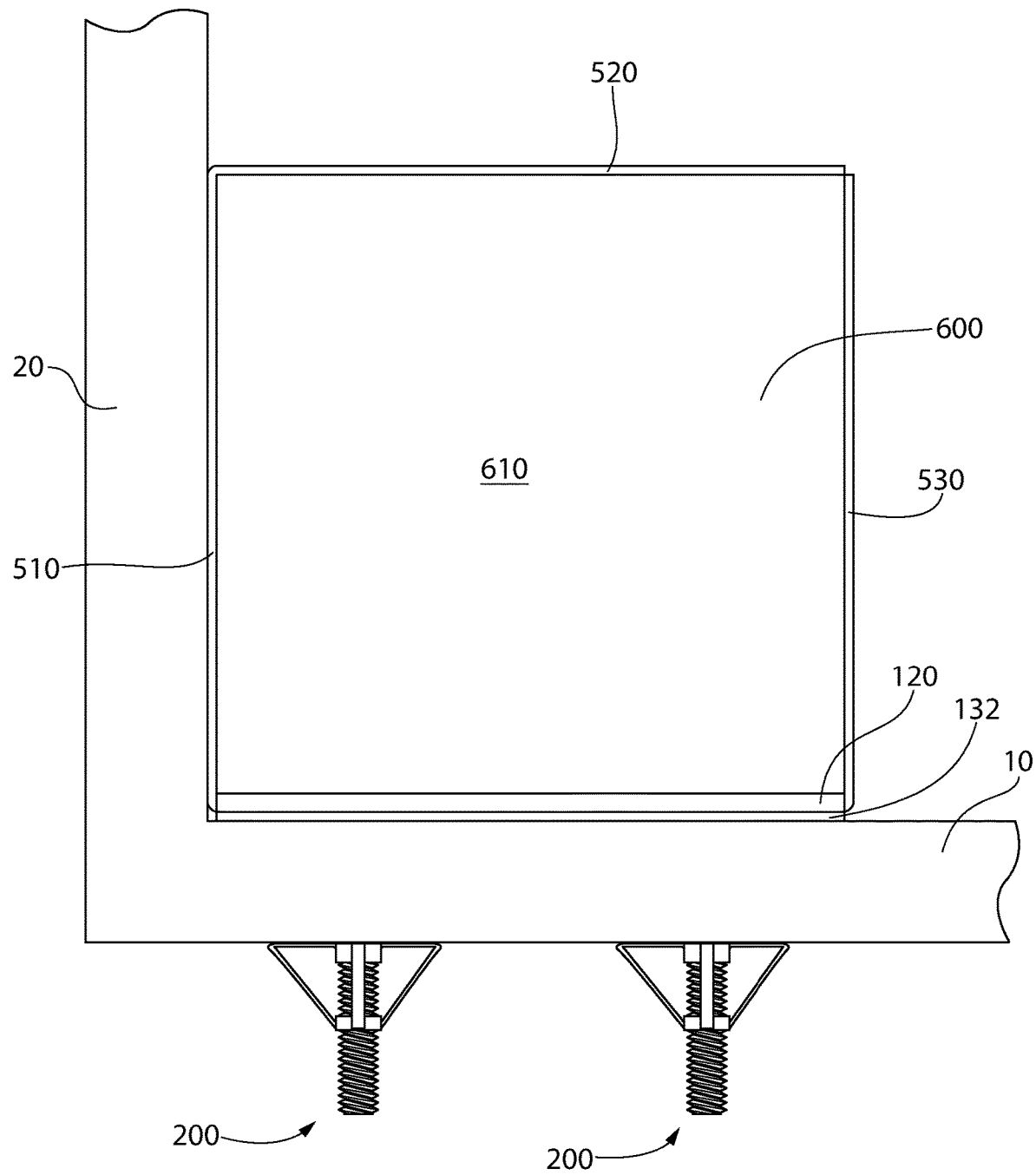
FIG. 21 is a top view of a shelf unit and the mounting system and support of FIG. 9 in an assembled state.
Figure 22:
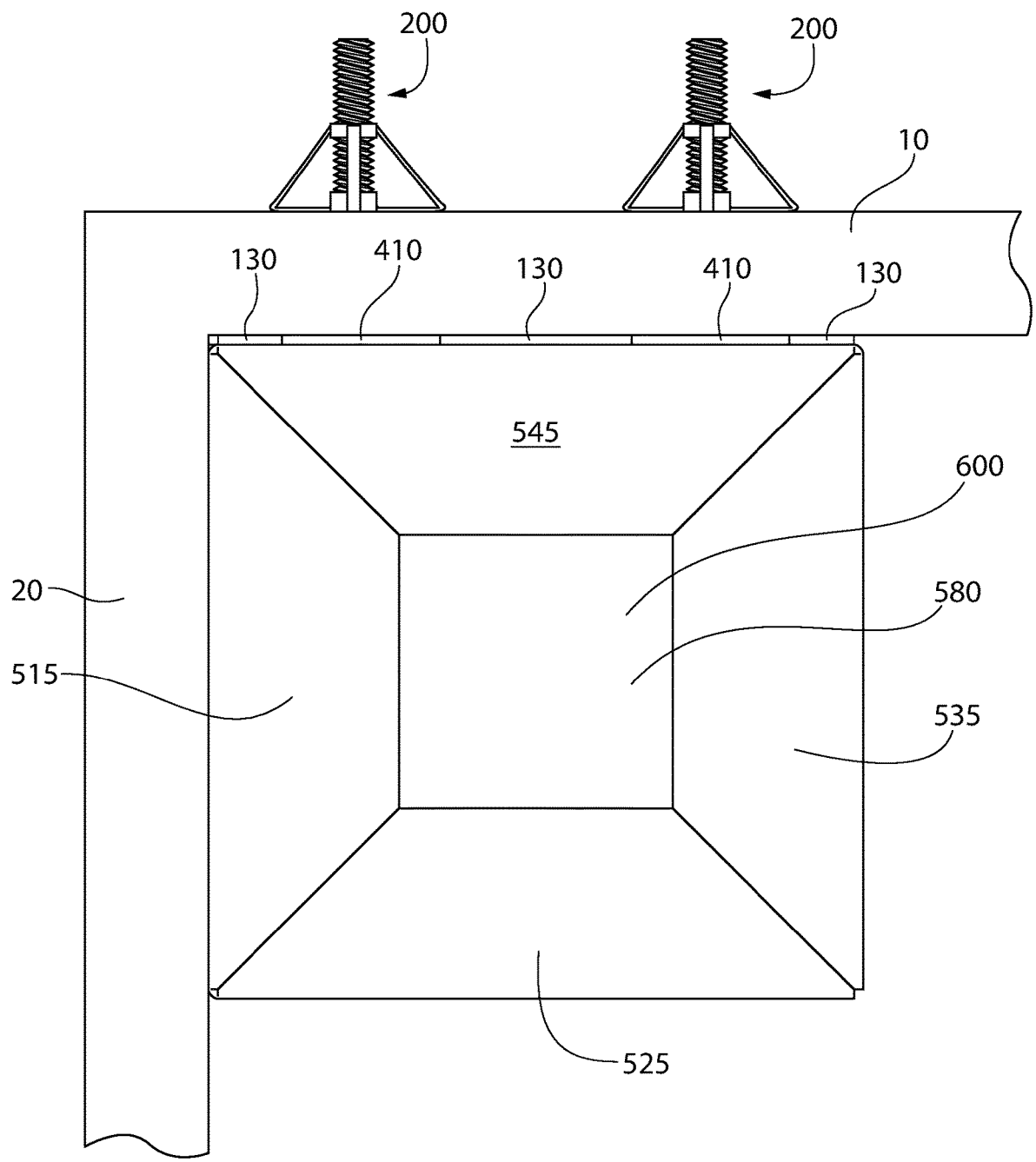
FIG. 22 is a bottom view of a shelf unit and the mounting system and support of FIG. 9 in an assembled state.
Figure 23:
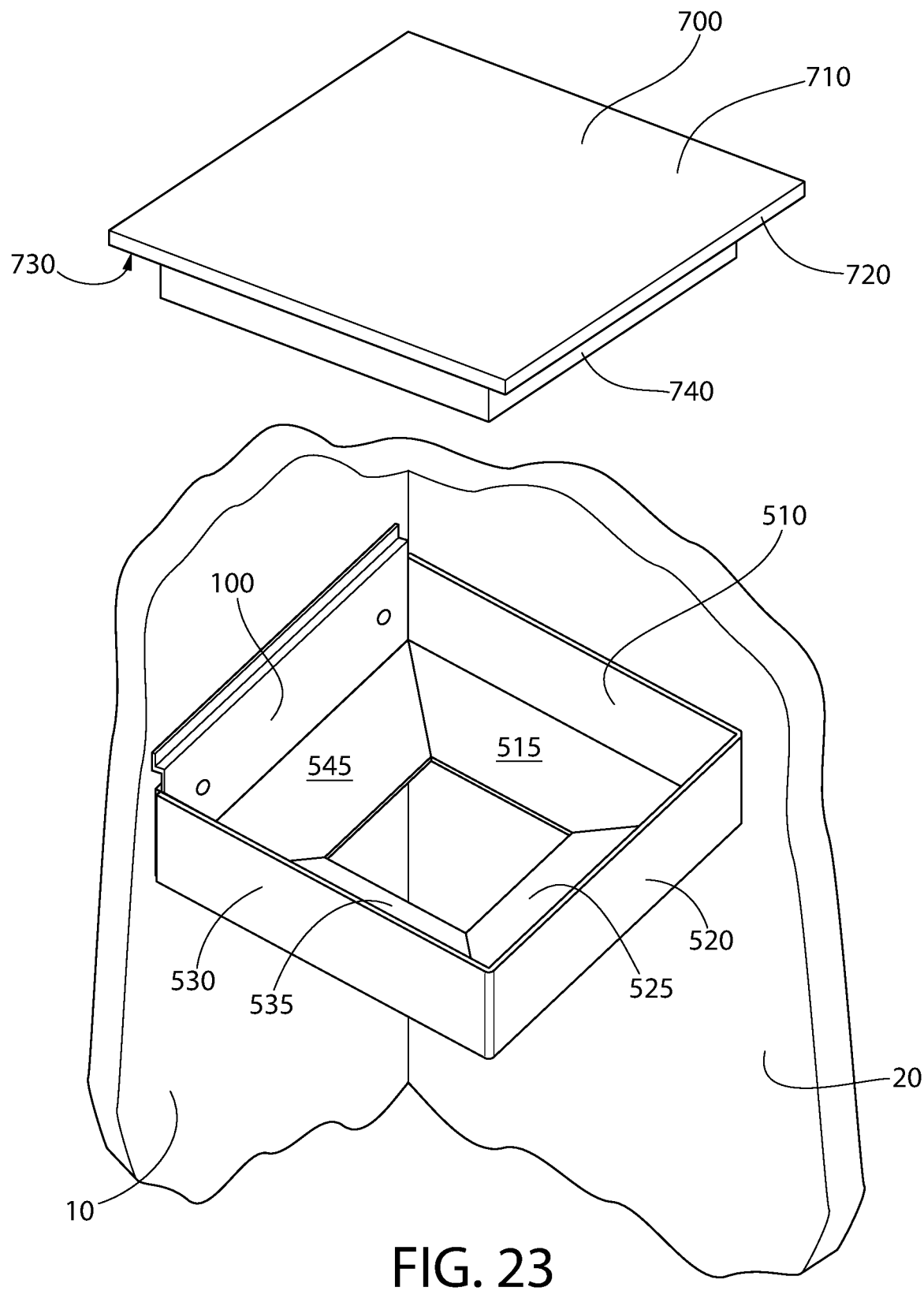
FIG. 23 is an exploded upper perspective view of a second embodiment of a shelf unit and the mounting system and support of FIG. 9.

FIG. 21 is a top view of shelf insert 600 in the installed position. FIG. 22 is a bottom view of shelf insert 600 in the installed position. The bottom of shelf insert 600 can be seen through opening 580 in FIG. 22.

FIGS. 23-27 show another example of a shelf insert 700 that can be used with support structure 500. Insert 700 comprises an upper portion 709 defining an exposed top surface 710 of the shelf and a lower insert portion 740 configured for insertion into open receptacle 900 of the perimeter frame support structure 500. Upper portion 709 has greater lateral dimensions (e.g. width and depth) measured across top surface 710 than the lower insertion portion 740. In this example, shelf insert 700 has a top surface 710 that extends beyond the perimeter frame and the downwardly projecting insert portion 740 forming cantilevered overhangs 711 such that an edge 720 of shelf insert 700 is visible. This is in contrast to shelf insert 600 previously described herein which has a top that does not extend beyond its sides and the perimeter frame (see, e.g. FIGS. 19 and 20).

Figure 25:
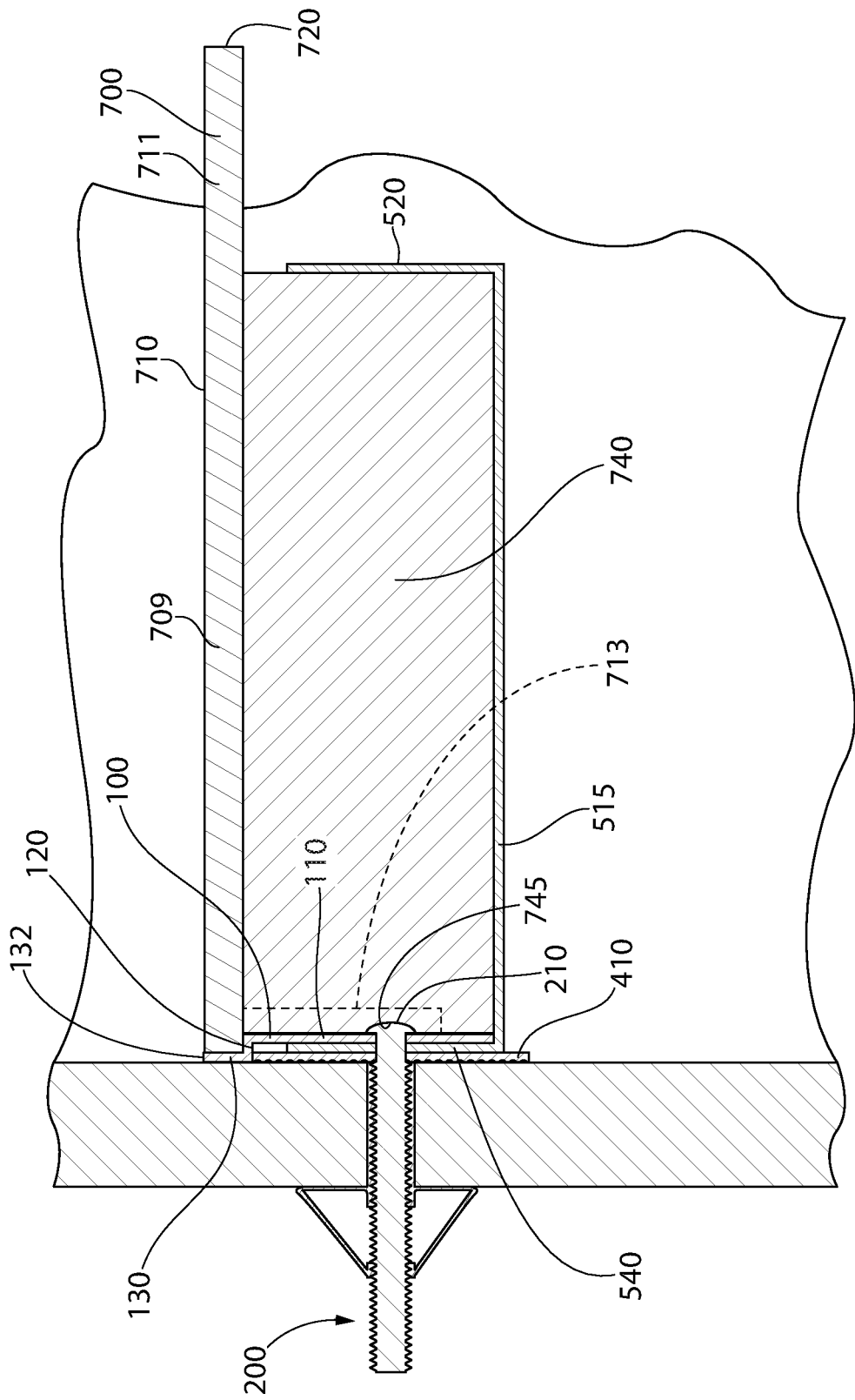
FIG. 25 is a side sectional view of the shelf unit and mounting system and support of FIG. 23.

Shelf insert 700 can be dimensioned so that when it is lowered into the perimeter frame support structure 500, the insert's bottom surface contacts and rests on horizontal portions 515, 525, 535, 545 of the support structure (see FIG. 25). In this position, shelf insert 700 rests on ledge 120 of cover 100 and top surface 710 is flush with upper edge 132 of cover 100. The cantilevered overhangs 711 formed by the upper portion 709 that extend perimetrically around the upper portion 709 and which are located above the upper edges of sides 520 and 530 of support structure 500 extend further from insert portion 740 than does the overhang 711 that is located above the upper edge of side 510 of support structure 500. This is because, in this example, wall 20 prevents the overhang that is located above the upper edge of side 510 from extending more than the thickness of side 510. In other examples where support structure 500 is not corner mounted and in contact with a wall perpendicular to wall 10 such as wall 20, the overhangs of shelf insert 700 can extend beyond all four the sides of perimeter frame support structure 500.

As shown in FIG. 25, the upper portion 709 of the shelf insert 600 does not contact sides 510-540 and is spaced vertically apart from perimeter frame support structure 500. In other possible embodiments, the shelf insert 600 and perimeter frame support structure 500 may be configured so that the overhangs 711 of the upper portion 709 may rest on the top edges of the lateral sides 510, 530 and front side 520 of the perimeter frame.

Figure 24:
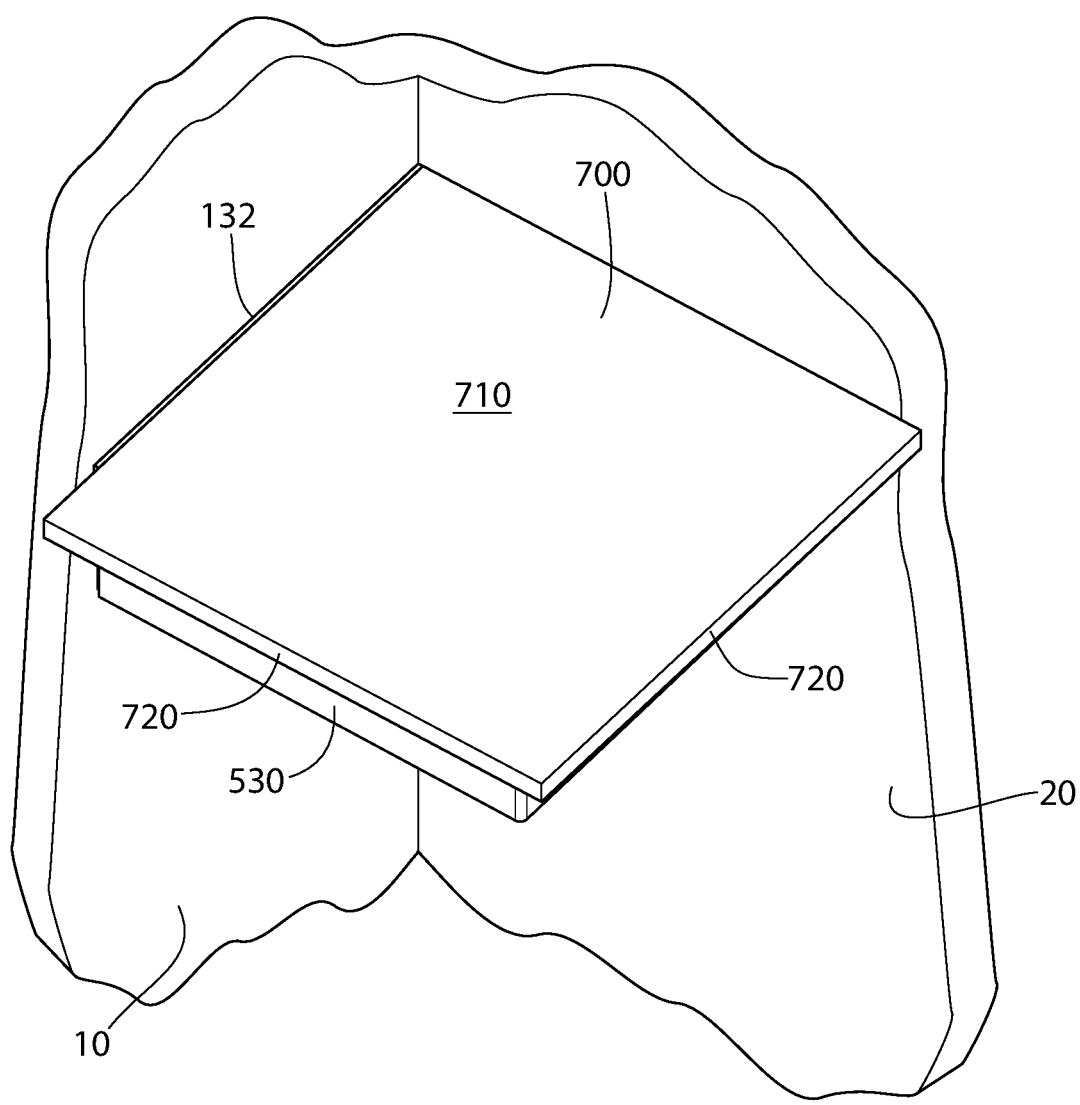
FIG. 24 is an upper perspective view of the shelf unit and mounting system and support of FIG. 23 in an assembled state.

FIG. 24 shows shelf insert 700 installed in support structure 500. In this view, upper edge 132 of cover 100 is visible. In some embodiments, upper edge 132 is flush with top surface 710 of shelf insert 700. In other embodiments, upper edge 132 extends above top surface 710. In other embodiments, upper edge 132 and ledge 120 of cover 100 extend above top surface 710. In some embodiments where upper edge 132 and ledge 120 extend above top surface 710, an underside 730 of top surface 710 rests on the upper edges of sides 510, 520, 530 instead of, or in addition to, the bottom of shelf insert 700 contacting horizontal portions 515, 525, 535, 545 of support structure 500.

FIG. 25 is a side sectional view of shelf insert 700 installed in support structure 500. In this example, shelf insert 700 has a groove 745 that runs horizontally along the side that contacts side 540 of support structure 500. Groove 745 is configured to accept the protruding heads 210 of fasteners 200 and can provide a locking feature that is not permanent. Shelf insert 700 is, in this example, pressed into support structure 500 until heads 210 engage groove 745, thereby locking shelf insert 700 into place. Shelf insert 700 can then be removed by pushing it upward to disengage heads 210 from groove 745. Access to the bottom of shelf insert 700 is available through opening 580 (see FIG. 27). In other examples, individual indentations are provided for each head 210 instead of a single groove 745 that receives all heads 210. In other possible constructions, a non-locking shelf insert 600 may be provided which includes a large single rear facing cavity 713 (represented by dashed lines) formed in lower insert portion 740 of the shelf insert for receiving the fastener heads 210. Alternatively, two individual smaller individual cavities 713 (i.e. one for each fastener head) may instead be provided. In yet other constructions, flat head fasteners 200 may be used and the mounting holes 560 in rear side 540 of the support structure may be countersunk to eliminate the need for the rear cavities or groove where a self-locking shelf insert 600 is not required.

Figure 26:
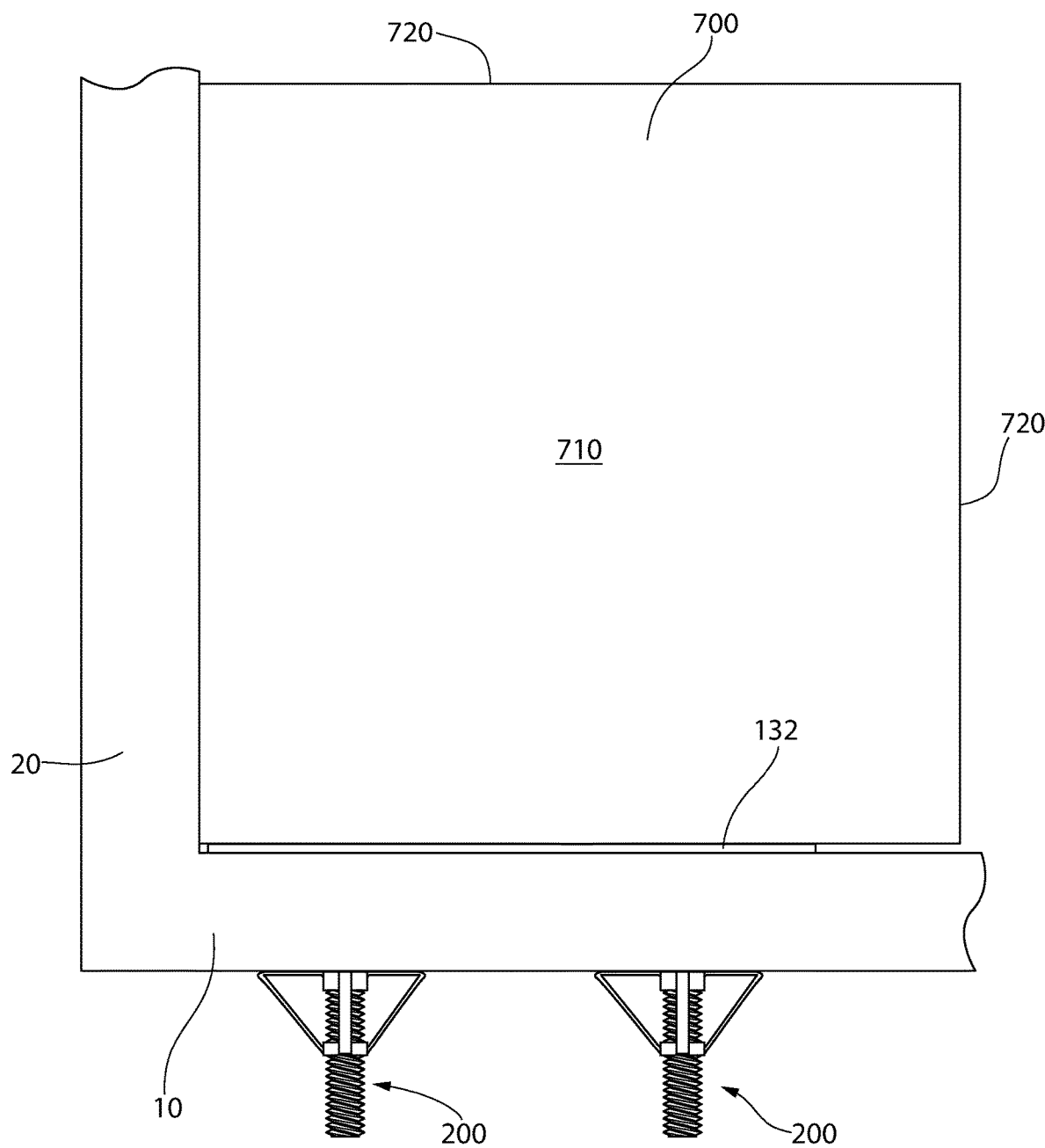
FIG. 26 is a top view of the shelf unit and mounting system and support of FIG. 23.
Figure 27:
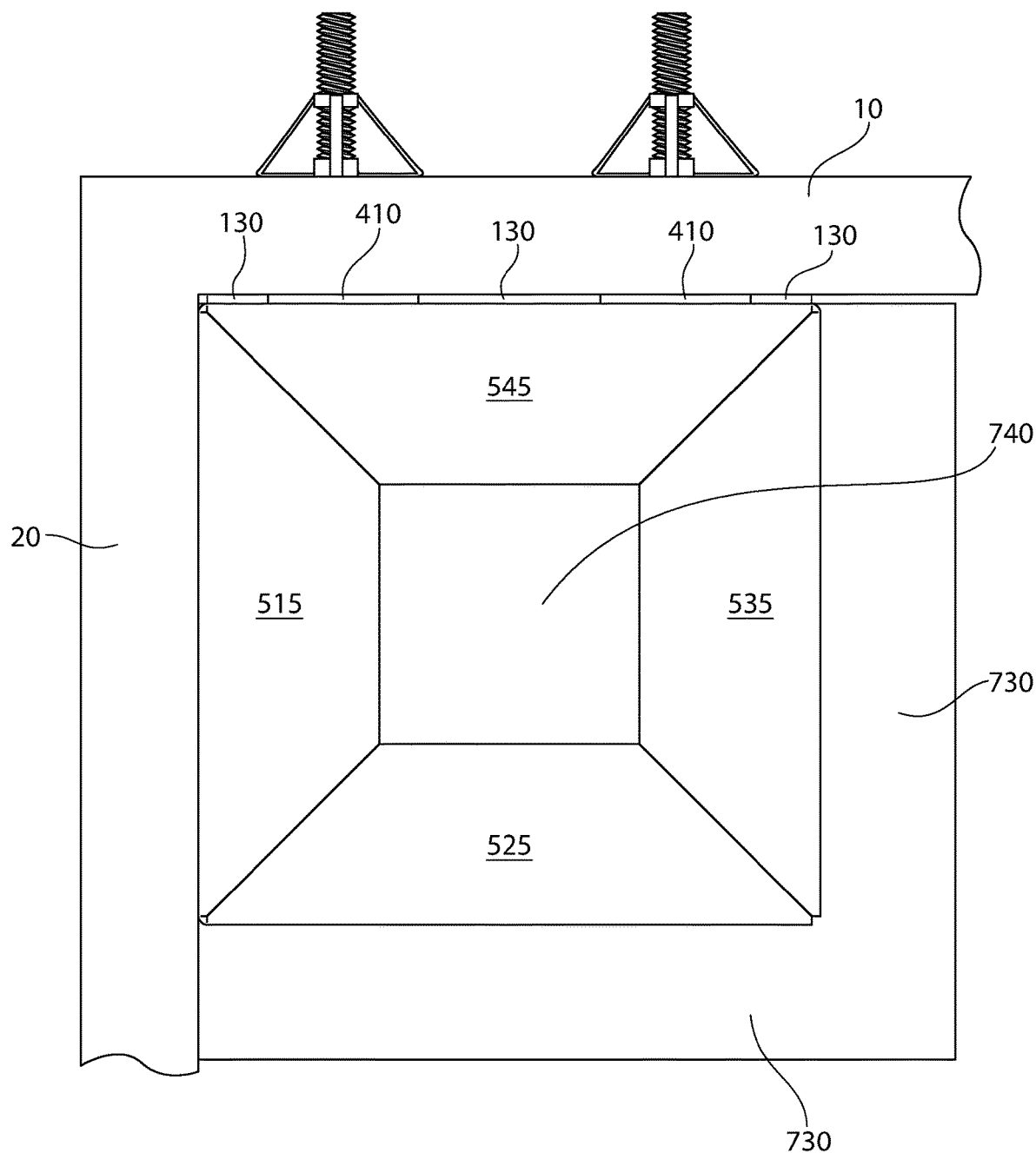
FIG. 27 is a bottom view of the shelf unit and mounting system and support of FIG. 23.

FIG. 26 is a top view of shelf insert 700 in the installed position. FIG. 27 is a bottom view of shelf insert 700 in the installed position. In FIG. 27, the bottom of shelf insert 700 can be seen through opening 580 and the underside 730 of top surface 710 can be seen extending beyond sides 520 and 530 of support structure 500.

It bears noting that the lower insert portion 740 may be formed of a stronger core material which is not esthetically pleasing while the visible upper portion 709 is made of a different more esthetically pleasing material in appearance. In other embodiments, the upper and lower portions may be parts of a monolithic unitary structure formed of a single material.

Figure 28:
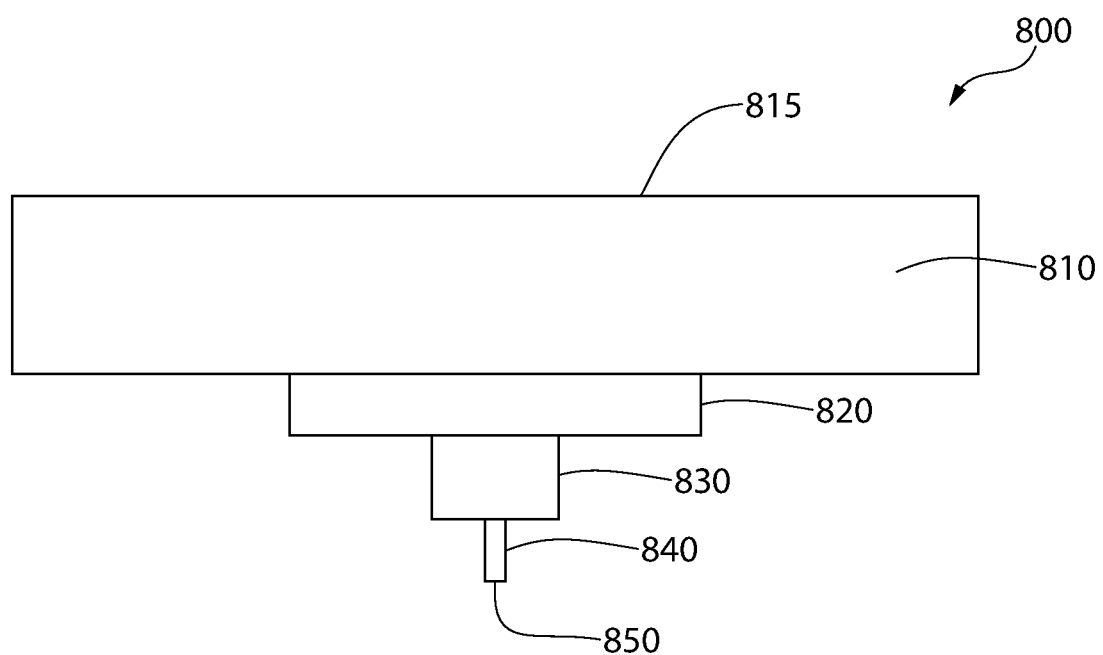
FIG. 28 is side view of a soap dispenser in accordance with embodiments of the invention.
Figure 29:
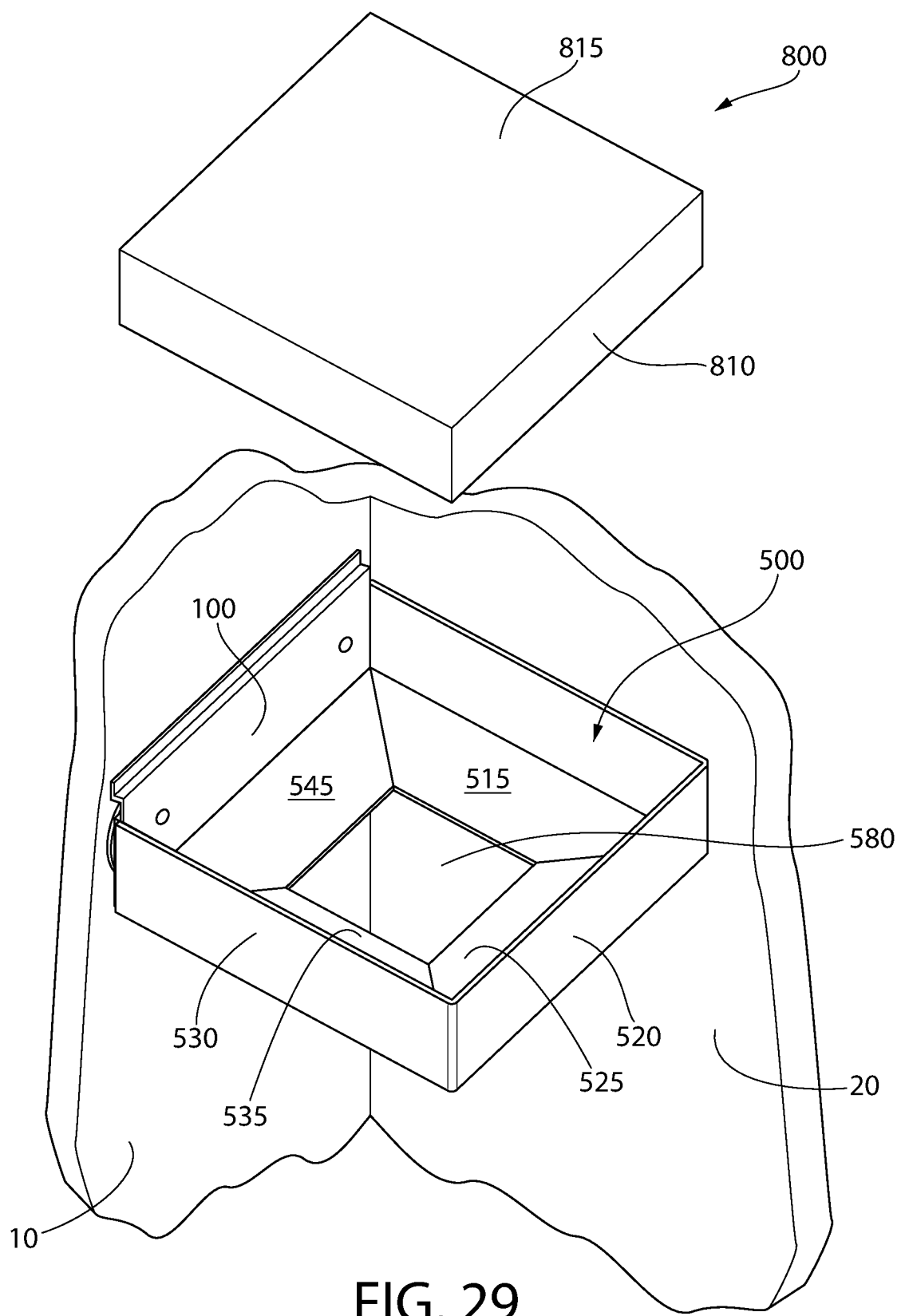
FIG. 29 is an exploded upper perspective view of the soap dispenser of FIG. 28 and the mounting system and support of FIG. 9.
Figure 30:
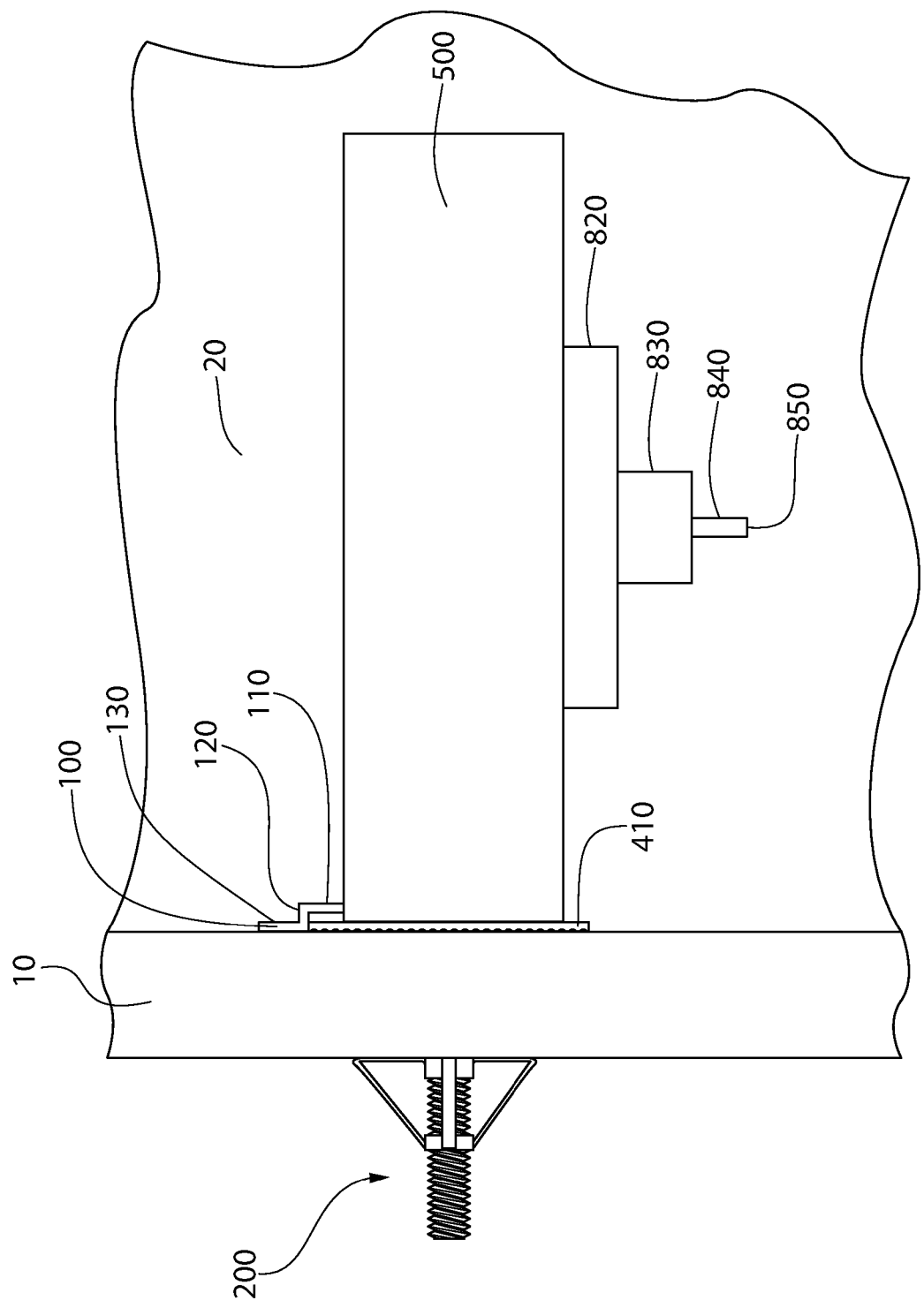
FIG. 30 is a side view of the soap dispenser and mounting system and support of FIG. 29 in an assembled state.
Figure 31:
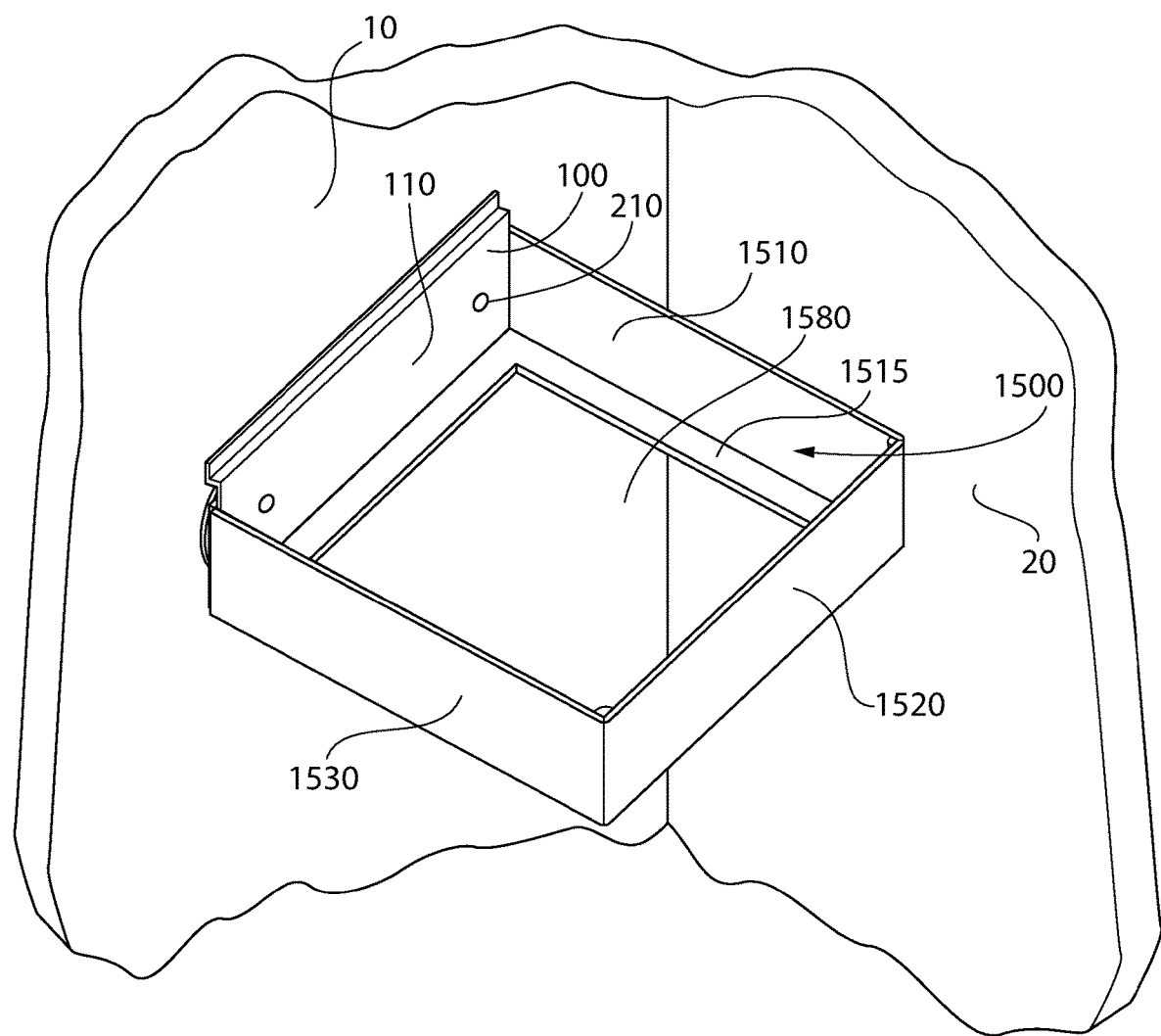
FIG. 31 is an upper perspective view of a mounting system and support in accordance with exemplary embodiments of the invention.

FIGS. 28-30 show an example of an accessory other than a shelf that can be install in support structure 500. This example shows a soap dispenser 800, but any accessory that can be supported by support structure 500 can be substituted for soap dispenser 800.

FIG. 28 shows soap dispenser 800 having a reservoir 810 that holds soap to be dispensed by soap dispenser 800. In this example, reservoir 810 fits completely inside of support structure 500 such that an upper surface 815 is flush with the upper edges of the sides of support structure 500. A first extension 820 extends down from reservoir 810 and, when installed in support structure 500, extends through opening 580 (see FIG. 30). A second extension 830 extends down from first extension 820 and can house a pump that expels soap from soap from soap dispenser 800. A distributing tube 840 extends down from second extension 830 and terminates with a nozzle opening 850 through which soap is dispensed.

FIG. 30 shows soap dispenser 800 in an installed position with first extension 820, second extension 830, and distributing tube 840 extending out of opening 580 and below support structure 500.

FIGS. 31-34 show an example of an alternate embodiment of the invention. In this example, support structure 1500 has four side elements or members 1510, 1520, 1530, 1540 (also referred to as "sides" for brevity). Unlike other examples that have four horizontal portions, this example has a single horizontal portion 1515 extending from all four sides 1510, 1520, 1530, 1540 toward a central opening 1580 of support structure 1500. In other examples, the four horizontal portions could have their adjacent edges attached to each by welding or some other means. In this example, the vertical edges between the adjacent ones of sides 1510, 1520, 1530, 1540 are attached to each other by welding or some other means. In other examples, the vertical edges of sides 1510, 1520, 1530, 1540 contact the vertical edges of the adjacent sides, but are not attached to those adjacent vertical edges. In other examples, the vertical edges of sides 1510, 1520, 1530, 1540 do not contact the vertical edges of the adjacent sides. In some examples, horizontal portion 1515 is solid such that no opening 1580 exists. In this example, side 1510 does not contact wall 20. In other examples, side 1510 contacts wall 20 but is not fastened to wall 20. In other examples, side 1520 is fastened to wall 20 in the same manner that side 1540 is fastened to wall 10.

Figure 32:
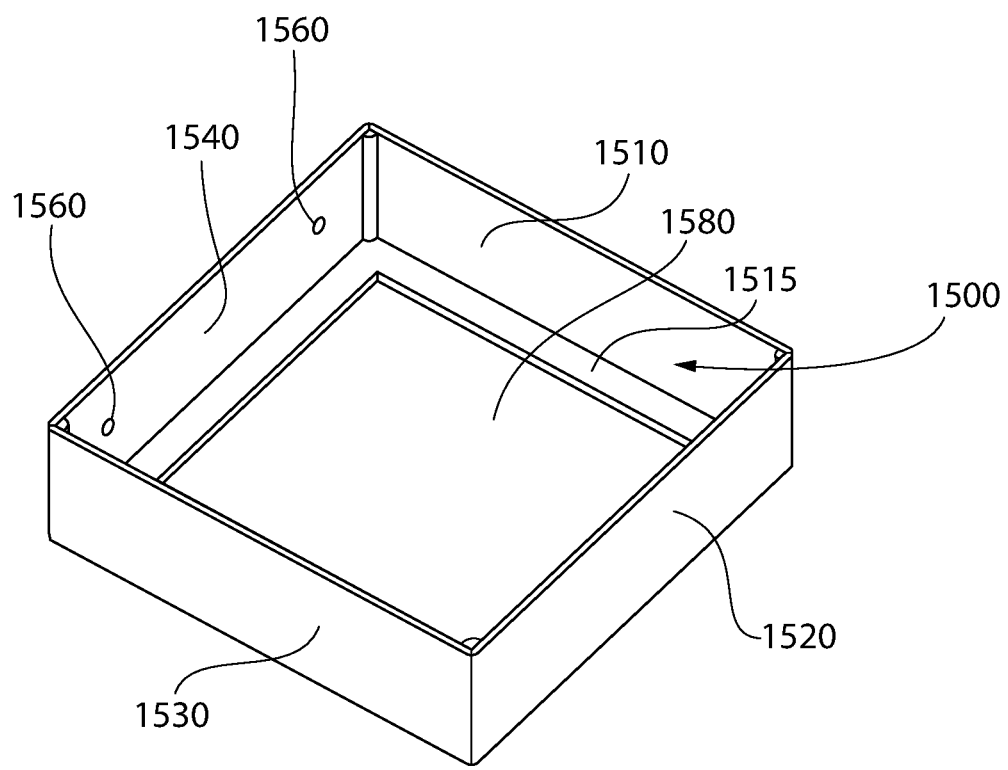
FIG. 32 is an upper perspective view of the support of FIG. 31.

FIG. 32 shows support structure 1500 as having two holes 1560 in side 1540. Holes 1560 serve the same purpose as holes 330 of shelf 300 (FIG. 4). Due to the fabrication method used in this example, a continuous corner exists between side 1510 and horizontal portion 1515, between side 1520 and horizontal portion 1515, between side 1530 and horizontal portion 1515, and between side 1540 and horizontal portion 1515. In contrast, a joint exists between each of the adjacent edges of sides 1510, 1520, 1530, 1540 (explained further below).

Figure 33:
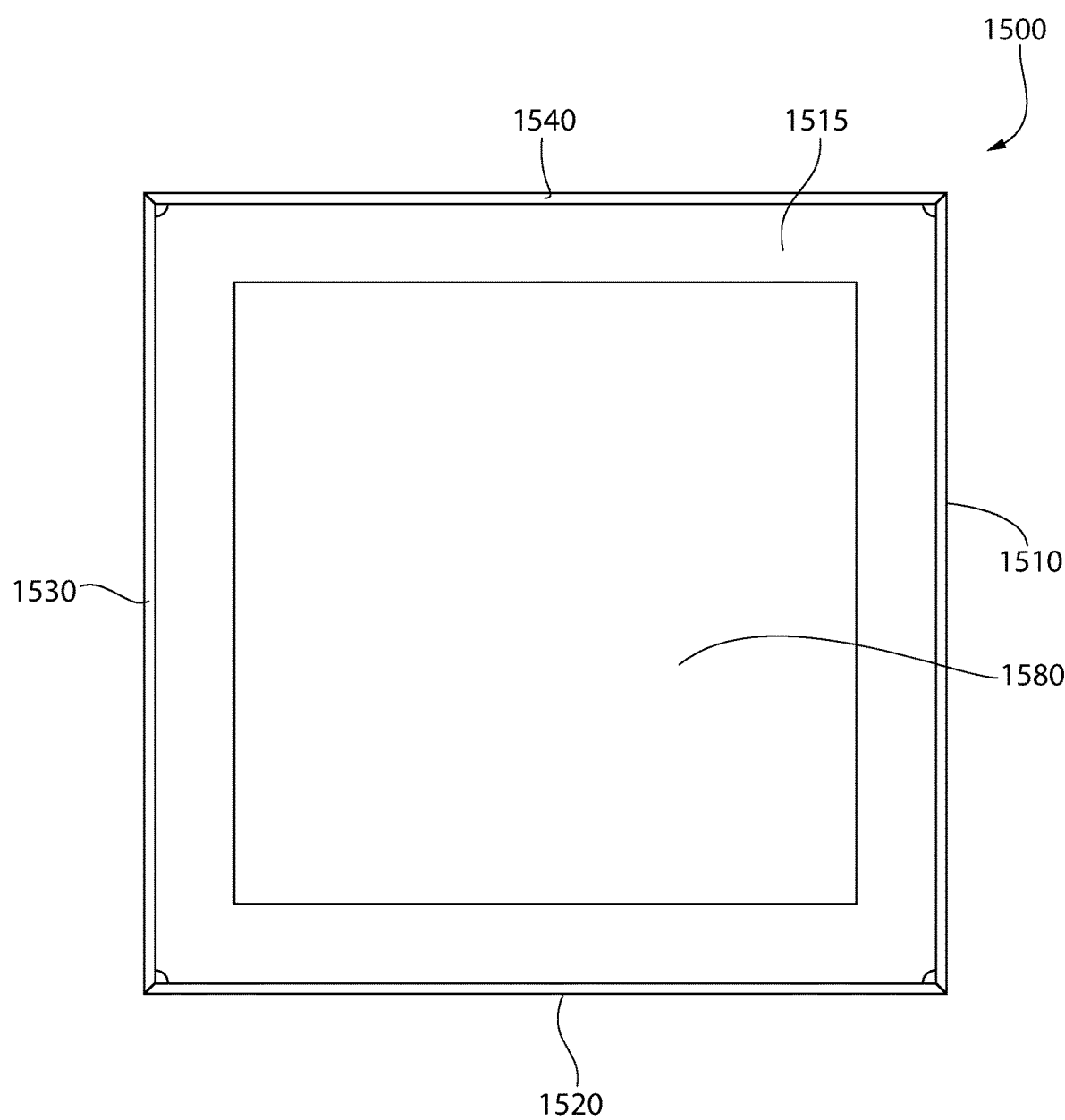
FIG. 33 is a top view of the support of FIG. 31.

FIG. 33 is a top view of support structure 1500 and shows opening 1580 and the joints at each of the corners between sides 1510, 1520, 1530, 1540.

Figure 34:
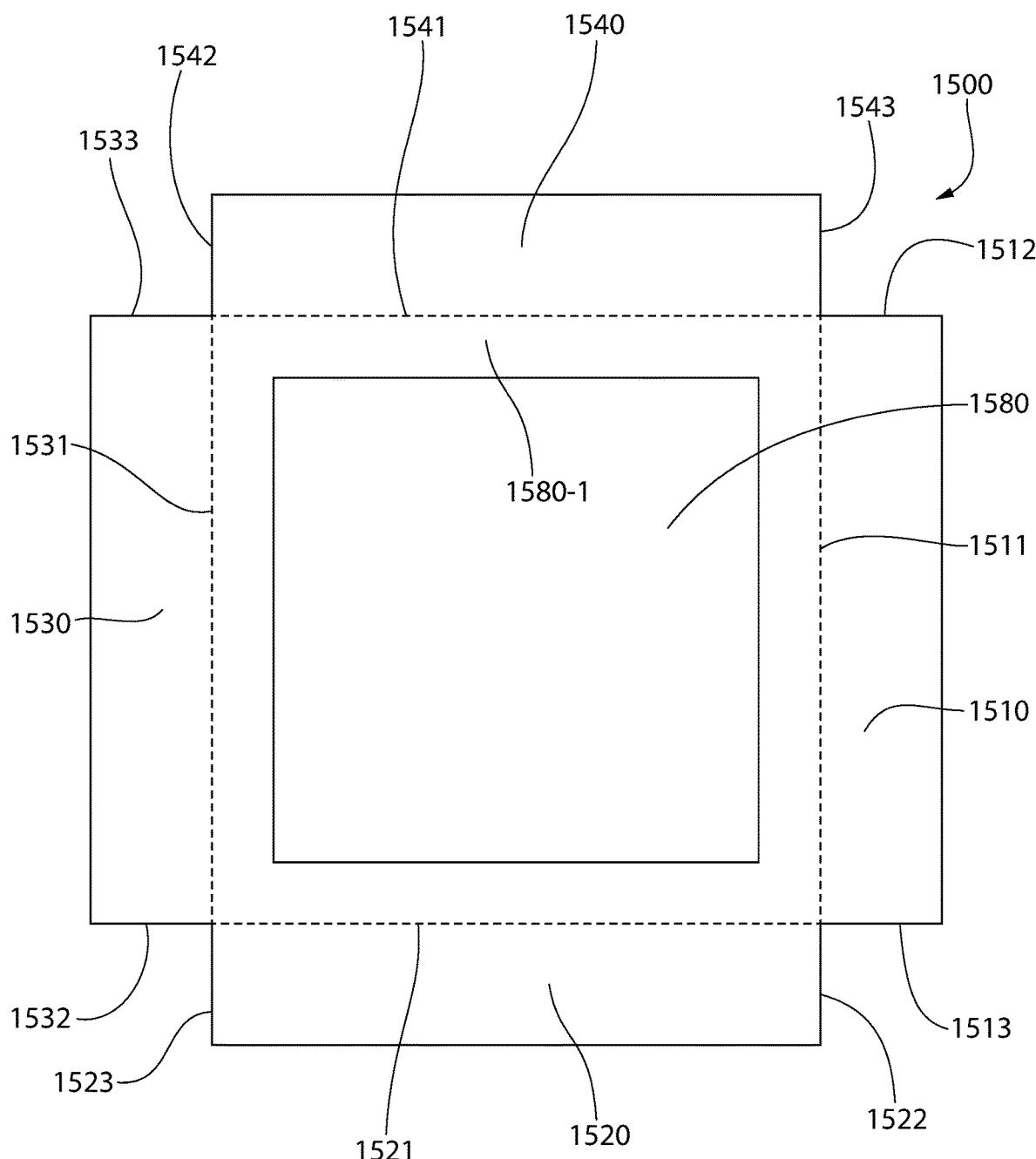
FIG. 34 is a top view of the support of FIG. 31 showing a workpiece blank in an unassembled state prior to being bent to shape.

FIG. 34 is a plan view of the perimeter frame support structure 1500 prior to assembly. This view shows a flat piece of workpiece material or blank after being cut to shape, but before being folded/bent and, in some examples, welded. In this view, horizontal portion 1515 is shown surrounding central opening 1580 as is the case after assembly. However, sides 1510, 1520, 1530, 1540 are shown in the same plane as horizontal portion 1515 prior to bending. Side 1510 is bent at, in this example, 90 degrees along line 1511. Side 1520 is bent at, in this example, 90 degrees along line 1521. After sides 1510 and 1520 are bent into position, edge 1513 of side 1510 and edge 1522 of side 1520 come into contact with each other and, in this example, are welded together. Side 1530 is bent at, in this example, 90 degrees along line 1531. After sides 1520 and 1530 are bent into position, edge 1523 of side 1520 and edge 1532 of side 1530 come into contact with each other and, in this example, are welded together. Side 1540 is bent at, in this example, 90 degrees along line 1541. After sides 1530 and 1540 are bent into position, edge 1533 of side 1530 and edge 1542 of side 1540 come into contact with each other and, in this example, are welded together. After sides 1540 and 1510 are bent into position, edge 1543 of side 1540 and edge 1512 of side 1510 come into contact with each other and, in this example, are welded together. This assembly procedure results in the box-shaped support structure 1500 shown in FIG. 32. While welding is used in this example, other examples can use other joining methods. Still other examples do not join the edges of the sides, but instead rely on the strength of the material alone to maintain the desired shape. For example, a stainless steel or other materials of sufficient thickness can be used without welding the edges and still provide the required rigidity and strength. It bears noting that using the present workpiece to fabricate the perimeter frame may be more expedient and cost effective than the workpiece blank shown in FIGS. 16-17. For example, the rectilinear annular bottom horizontal portion 1580-1 of perimeter frame 1500 has a contiguous and continuous structure. This contrasts to the perimeter frame 500 seen for example in FIG. 12 in which the horizontal portions is formed by multiple segments each associated with a vertical side portion of side elements 510-540 which create diagonal seams/joints between the horizontal portion, which are then optionally welded together alone the joints for rigidity.

Figure 35:
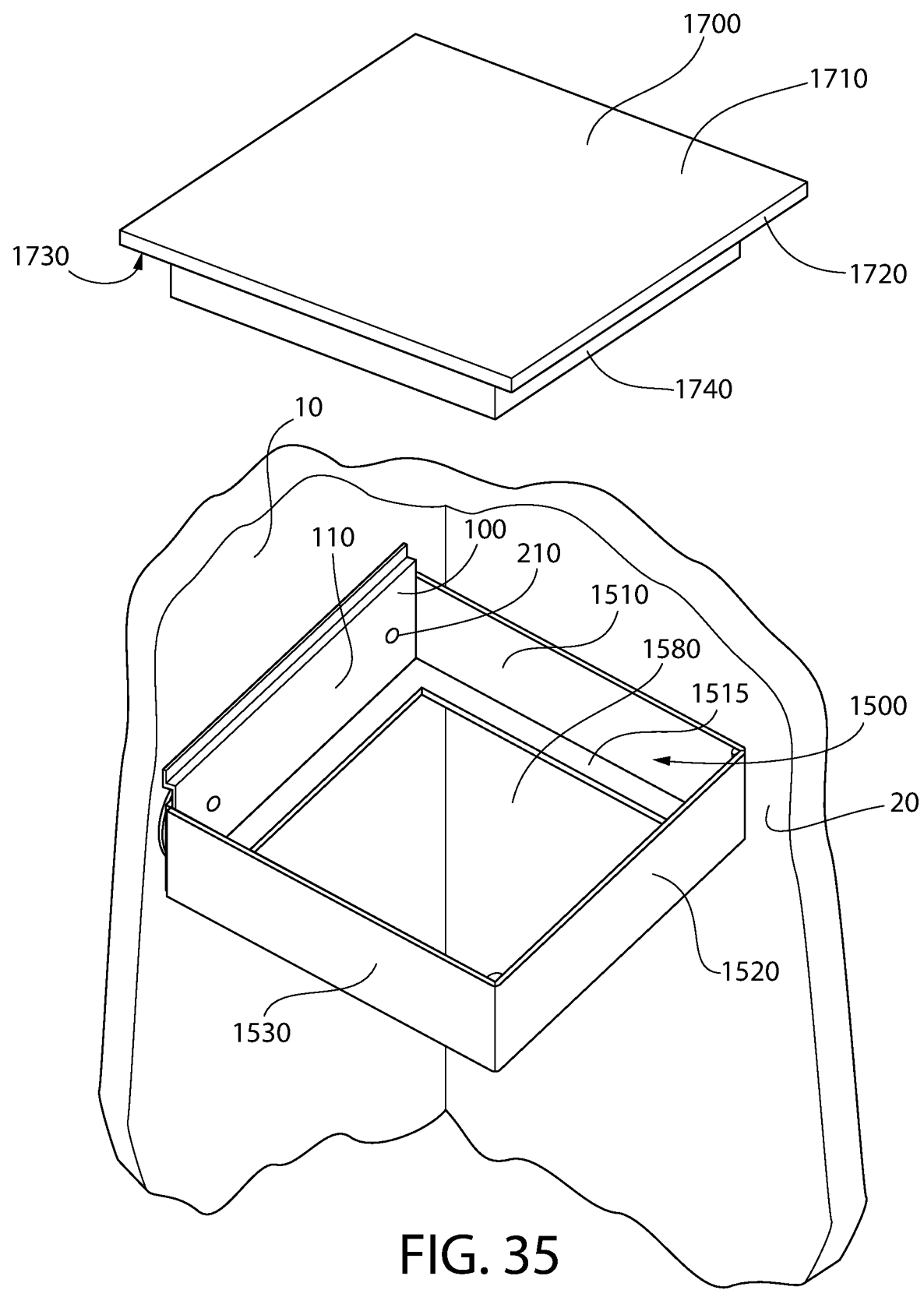
FIG. 35 is an exploded upper perspective view of a shelf unit and the mounting system and support of FIG. 31.
Figure 36:
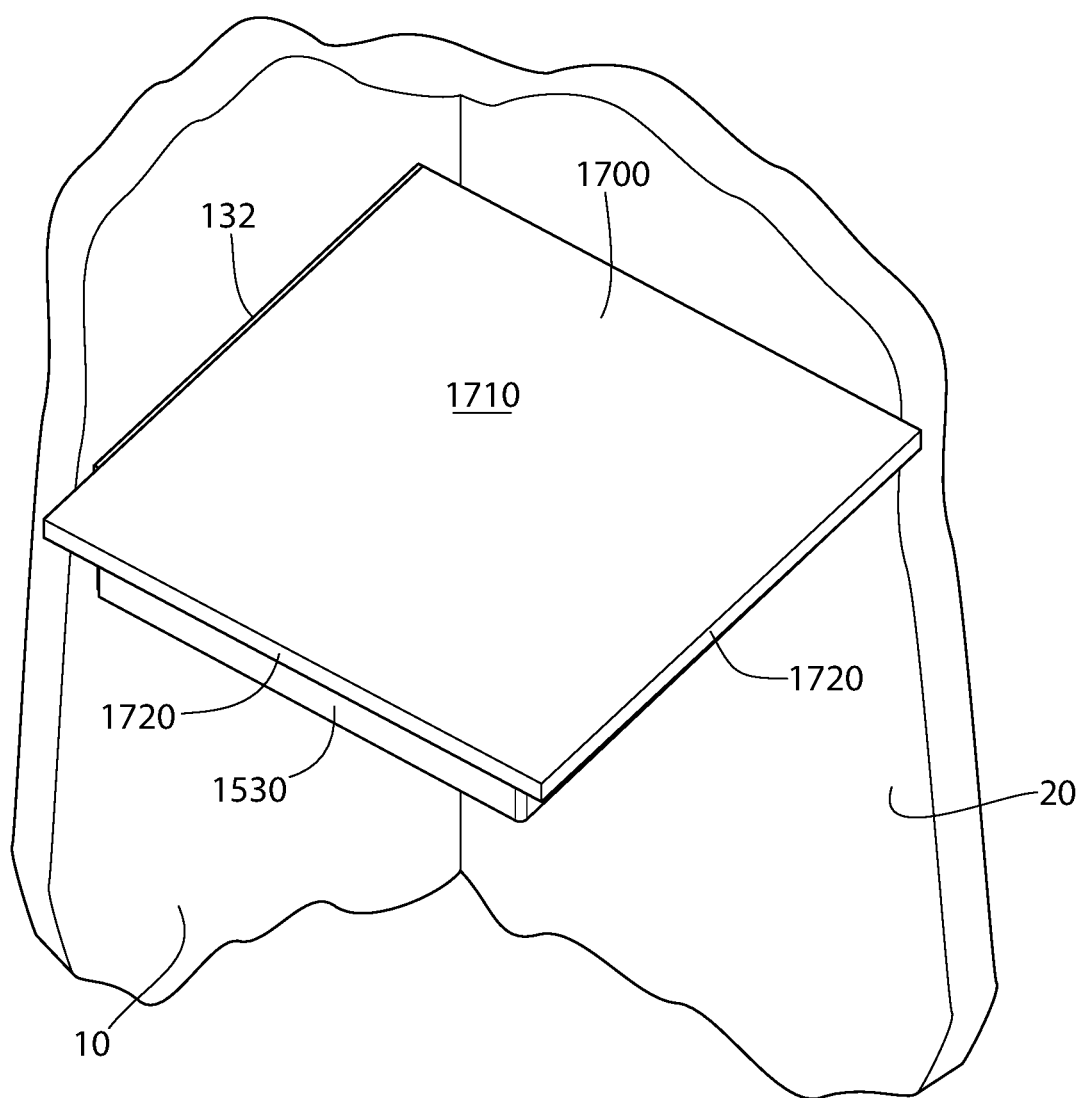
FIG. 36 is an upper perspective view of the shelf unit, mounting system, and support of FIG. 35 in an assembled state.

FIGS. 35 and 36 show an example of a shelf insert 1700 that can be used with support structure 1500. In this example, shelf insert 1700 has a top surface 1710 that extends beyond an insert portion 1740 such that an edge 1720 of shelf insert 1700 is visible. This is in contrast to shelf inserts which have a top that does not extend beyond its sides. Shelf insert 1700 is lowered into support structure 1500 until an under side 1730 of shelf insert 1700 contacts the upper edges of sides 1510, 5120, 1530, 1540. In some embodiments, this coincides with a bottom surface of insert portion 1740 contacting horizontal portion 1515 of support structure 1500. In some embodiments, only the bottom surface of insert portion 1740 contacts horizontal portion 1515 of support structure 1500, and underside 1730 does not contact the upper edges of sides 1510, 5120, 1530, 1540. In this position, in some embodiments, shelf insert 1700 rests on ledge 120 of cover 100 and top surface 1710 is flush with upper edge 132 of cover 100. The overhangs that are located above the upper edges of sides 1510, 1520, 1530 of support structure 1500 extend further from insert portion 740 than does the overhang that is located above the upper edge of side 1540 of support structure 1500. This is because of cover 100 preventing the overhang located above side 1540 from extending beyond a certain amount. In other examples, wall 20 prevents the overhang that is located above the upper edge of side 1510 from extending more than the thickness of side 1510.

FIG. 36 shows shelf insert 1700 installed in support structure 1500. In this view, upper edge 132 of cover 100 is visible. In some embodiments, upper edge 132 is flush with top surface 1710 of shelf insert 1700. In other embodiments, upper edge 132 extends above top surface 1710. In other embodiments, upper edge 132 and ledge 120 of cover 100 extend above top surface 1710. In some embodiments where upper edge 132 and ledge 120 extend above top surface 1710, underside 1730 of top surface 1710 rests on the upper edges of sides 1510, 1520, 1530 instead of, or in addition to, the bottom of shelf insert 1700 contacting horizontal portion 1515 of support structure 1500.

Figure 37:
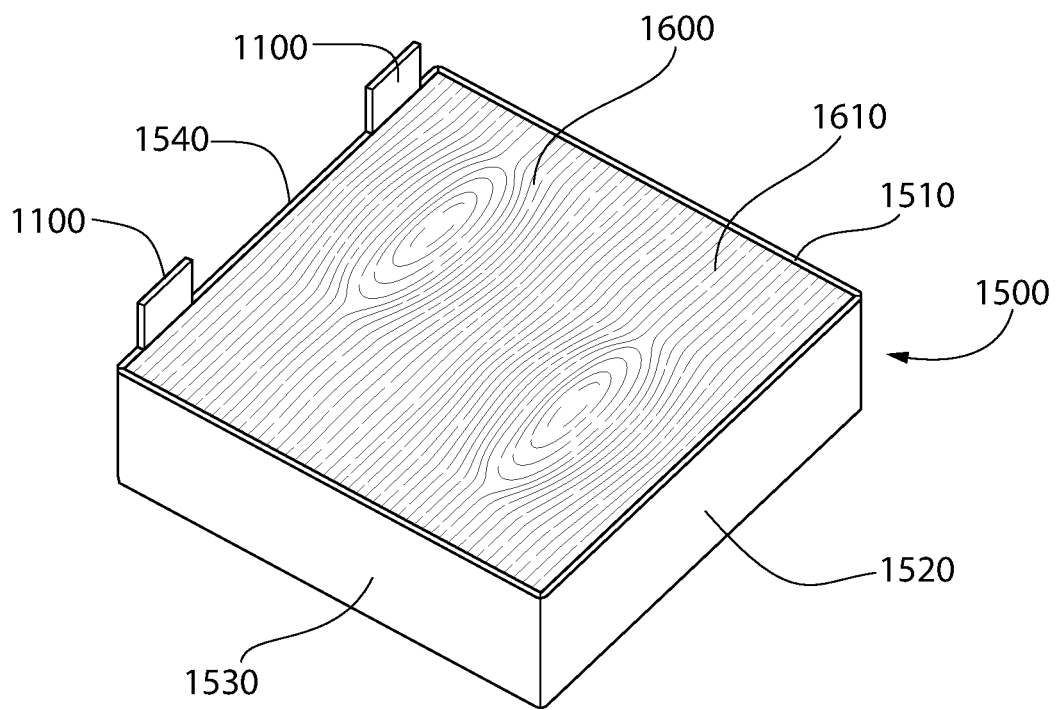
FIG. 37 is an upper perspective view of a shelf unit, mounting system, and support in accordance with exemplary embodiments of the invention in an assembled state.
Figure 38:
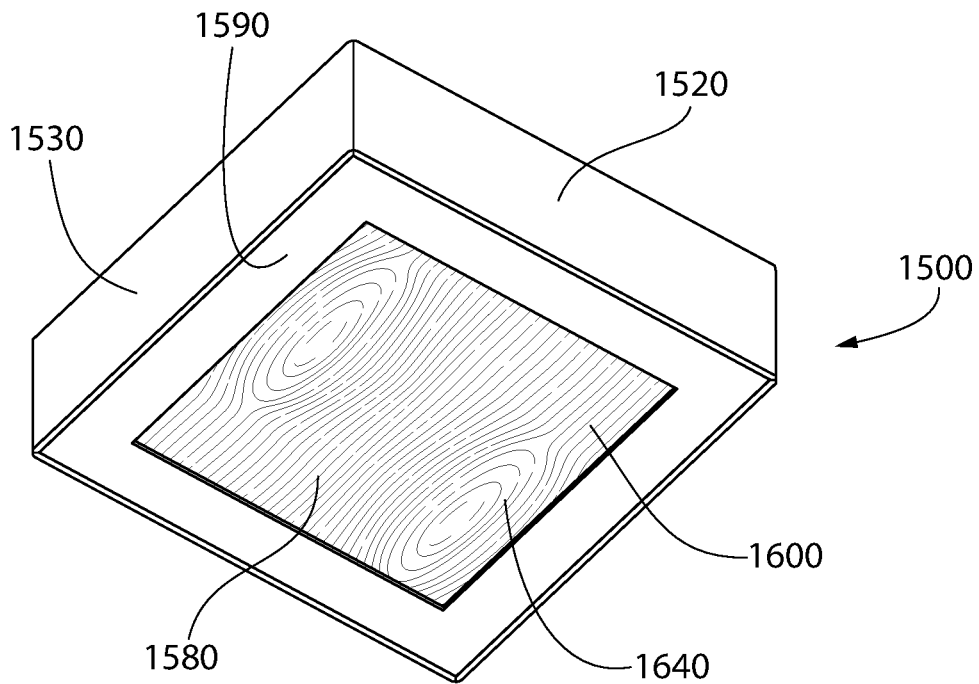
FIG. 38 is a lower perspective view of the assembly of FIG. 37.

FIG. 37 shows shelf insert 1600 in an installed position in support structure 1500. Shelf insert 1600 has a top surface 1610. In this example, shelf insert 1600 slides into support structure 1500 with a slight interference fit between its sides and sides 1510, 1520, 1530, 1540 until top surface 1610 is flush with the upper edges of sides 1510, 1520, 1530, 1540. In other embodiments, top surface 1610 is above or below the upper edges of sides 1510, 1520, 1530, 1540. In some embodiments, shelf insert 1600 slides into support structure 1500 with no interference between its sides and sides 1510, 1520, 1530, 1540. FIG. 38 shows a bottom view of shelf insert 1600 and support structure 1500. In this view the bottom surface 1640 of shelf insert 1600 is visible through central opening 1580 of support structure 1500. In this example, bottom surface 1640 of shelf insert 1600 rests on horizontal portion 1515 and top surface 1610 is even with the upper edges of sides 1510, 1520, 1530, 1540. In the example shown in FIGS. 37 and 38 shelf insert 1600 is made of wood. In other examples, shelf inserts can be made of metal, plastic, composites, or any other appropriate material.

Figure 39:
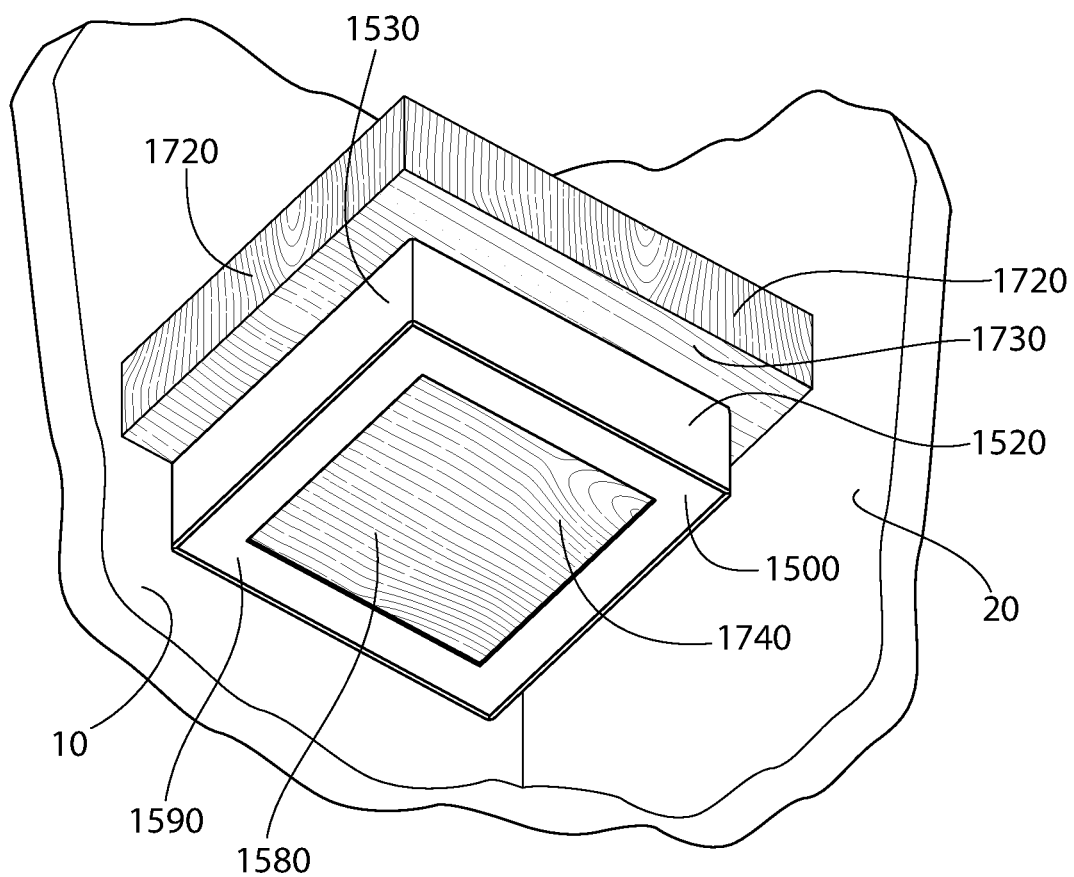
FIG. 39 is a lower perspective view of a shelf unit, mounting system, and support in accordance with exemplary embodiments of the invention in an assembled state.
Figure 40:
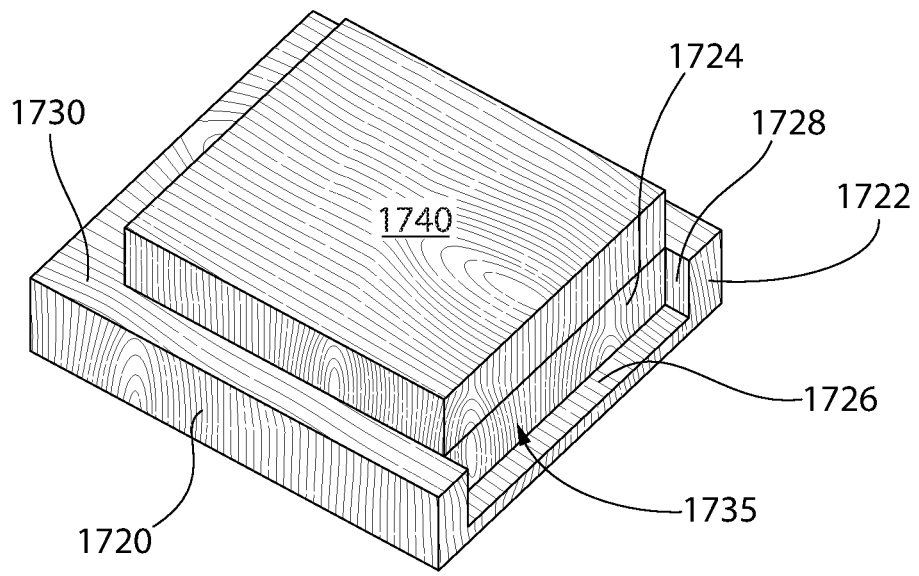
FIG. 40 is an upper perspective view of the underside of the shelf unit of FIG. 39.

FIG. 39 shows shelf insert 1700 in an installed position in support structure 1500. Shelf insert 1700 has a bottom surface 1740. In this example, shelf insert 1700 slides into support structure 1500 with a slight interference fit between its sides and sides 1510, 1520, 1530, 1540 until bottom surface 1740 contacts and rests on horizontal portion 1515 of support structure 1500 and/or underside 1730 rests on the upper edges of sides 1510, 1520, 1530, 1540. In some embodiments, shelf insert 1700 slides into support structure 1500 with no interference between its sides and sides 1510, 1520, 1530, 1540. FIG. 40 shows a bottom view of shelf insert 1700 and support structure 1500. In this view the bottom surface 1740 of shelf insert 1700 is visible through central opening 1580 of support structure 1500. In the example shown in FIGS. 39 and 40 shelf insert 1700 is made of wood. In other examples, shelf inserts can be made of metal, plastic, composites, or any other appropriate material.

The example shown in FIGS. 39 and 40 has a recess 1735 in the rear side of shelf insert 1700 that is adjacent to, in this case, wall 10. The following can also be applied to multiple sides of shelf insert 1700 if support structure 1500 is attached to multiple walls. Recess 1735 is provided to allow shelf insert 1700 to fit above and cover the attachment hardware used to attach support structure 1500 to the wall. This attachment hardware can include, for example, one or more covers 100, fasteners 200, and force-distributing plates 410. In this example, recess 1735 is bounded by rear facing surface 1724, and opposing inward lateral surfaces 1726 and 1728. Surface 1724 of recess 1735 is coplanar with the adjacent side of the portion of shelf insert 1700 that sits inside of support structure 1500. In other embodiments, surface 1724 of recess 1735 is on a different plane than the adjacent side of the portion of shelf insert 1700 that sits inside of support structure 1500. The edge 1720 of shelf insert 1700 that is adjacent to the wall when installed is reduced in area by recess 1735 to a smaller surface 1722. In the example shown in FIGS. 39 and 40, shelf insert 1700 is shown as two parts. However, in other embodiments shelf insert 1700 is one piece, or more than two pieces. The dimensions of recess 1735 can be dictated by the size of the hardware that is used and needs to be covered.

Figure 41:
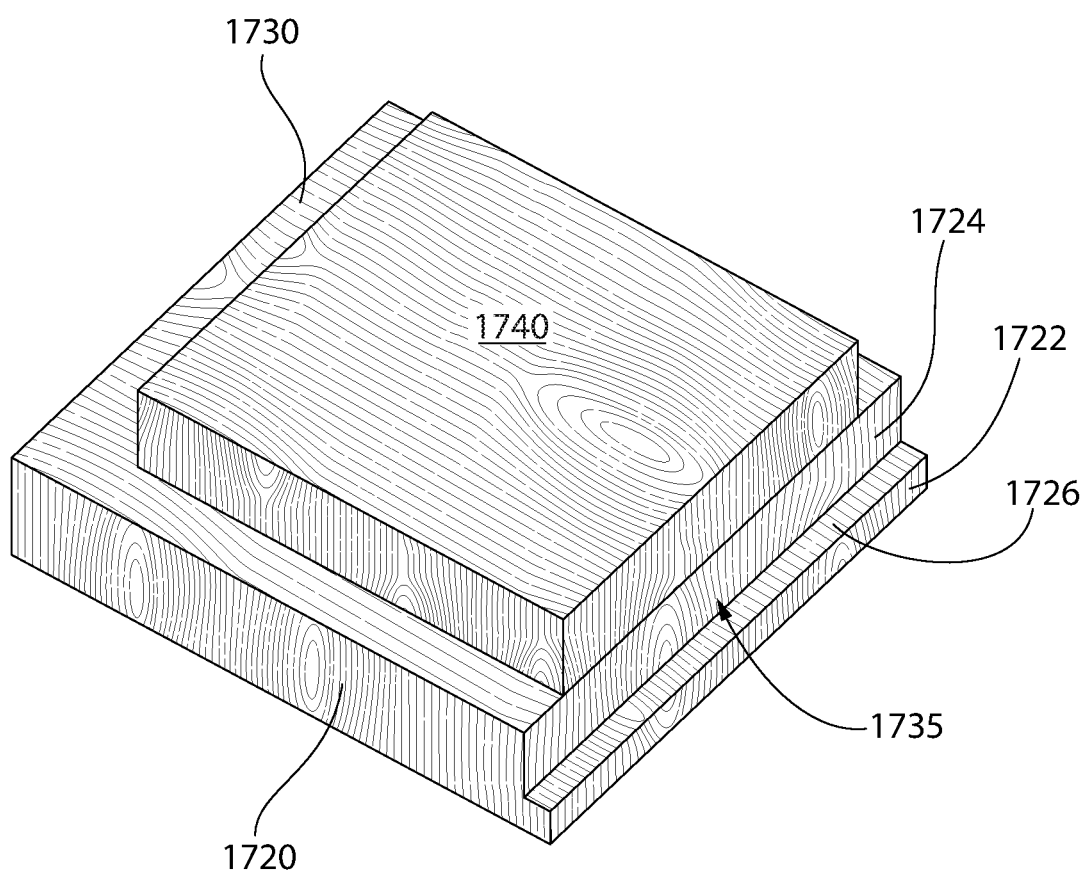
FIG. 41 is an upper perspective view of the underside of a shelf unit in accordance with exemplary embodiments of the invention.

A slightly different embodiment of shelf insert 1700 is shown in FIG. 41. In this example, recess 1735 extends the entire width of shelf insert 1700. This embodiment might be easier to manufacture and does not contact the wall along the entire height of shelf insert 1700. This embodiment can be more universal due to its ability to fit over attachment hardware having a greater width than can the example shown in FIGS. 39 and 40. Surface 1724 of recess 1735 is coplanar with the adjacent side of the portion of shelf insert 1700 that sits inside of support structure 1500. In other embodiments, surface 1724 of recess 1735 is on a different plane than the adjacent side of the portion of shelf insert 1700 that sits inside of support structure 1500. The edge 1720 of shelf insert 1700 that is adjacent to the wall when installed is reduced in area by recess 1735 to a smaller surface 1722. In this example, shelf insert 1700 is shown as two parts. However, in other embodiments shelf insert 1700 is one piece, or more than two pieces. The dimensions of recess 1735 can be dictated by the size of the hardware that is used and needs to be covered.

Figure 42:
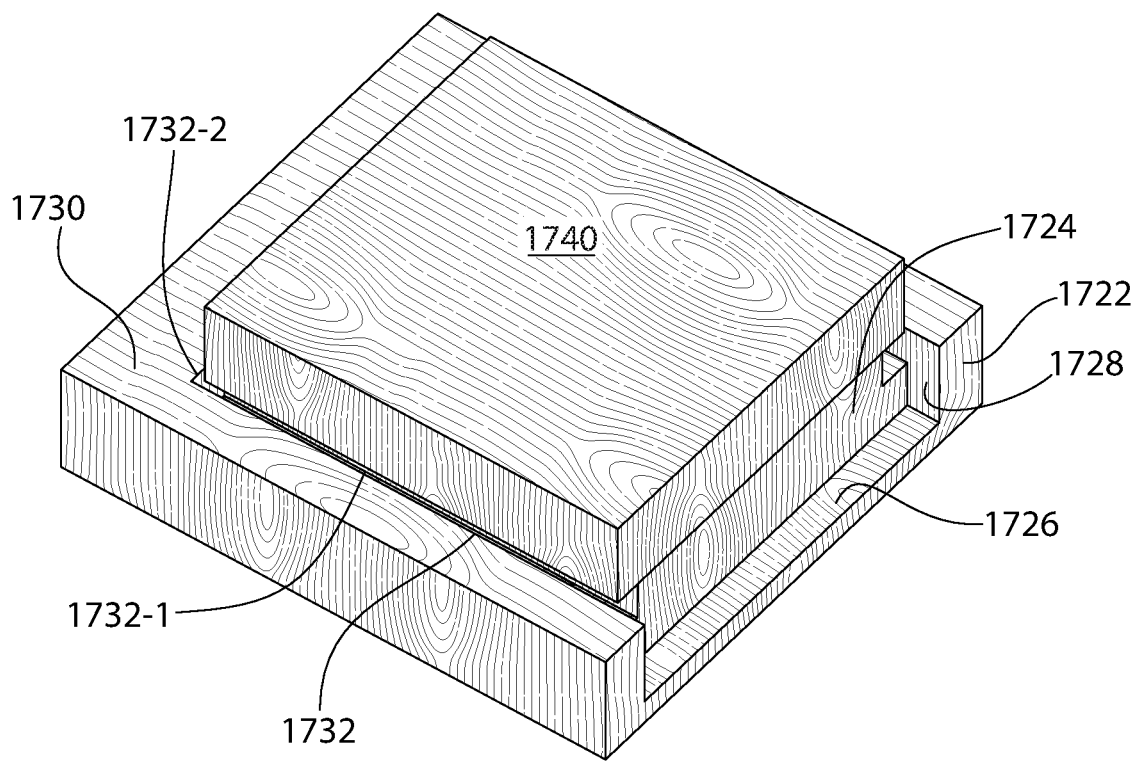
FIG. 42 is an upper perspective view of the underside of a shelf unit in accordance with exemplary embodiments of the invention.

FIG. 42 shows an example of shelf insert 1700 that is similar to the example shown in FIG. 40. However, the example shown in FIG. 42 has a rectilinear groove 1732 formed in underside 1730 of shelf insert 1700 and extends around the portion of shelf insert 1700 that sits inside of perimeter frame support structure 1500. The groove 1732 is U-shaped including two parallel groove sections 1732-1 that extend front to back and perpendicularly to the rear side of shelf insert 1700 (and wall 10 when the insert is mounted), and a transverse groove section 1732-2 extending right to left between the front ends of the groove sections 1732-1. The rear ends of groove sections 1732-1 may be open. Groove 1732 has a width just slightly larger than the thickness of the side elements 1510-1540 of the perimeter frame. Groove 1732 allows the top edges of side elements 1510, 1520, 1530 of support structure 1500 to extend upwards beyond underside 1730 and into groove 1732 so that the top edges of side elements 1510, 1520, 1530 of the perimeter frame cannot be seen. The lower portions of the perimeter frame (side elements 1510-1530) remain exposed and are visible. This can provide a different and cleaner look than other embodiments disclosed herein having the bottom edges of sides 1510, 1520, 1530 simply abut underside 1730 of the shelf insert 1700. This also can advantageously result in shelf insert 1700 being more positionally constrained by support structure 1500. Groove 1732 has a depth (measured between the top and bottom surfaces of shelf insert 1700) which is less than the height of the side elements 1510-1530 of the perimeter frame (support structure 1500).

Figure 43:
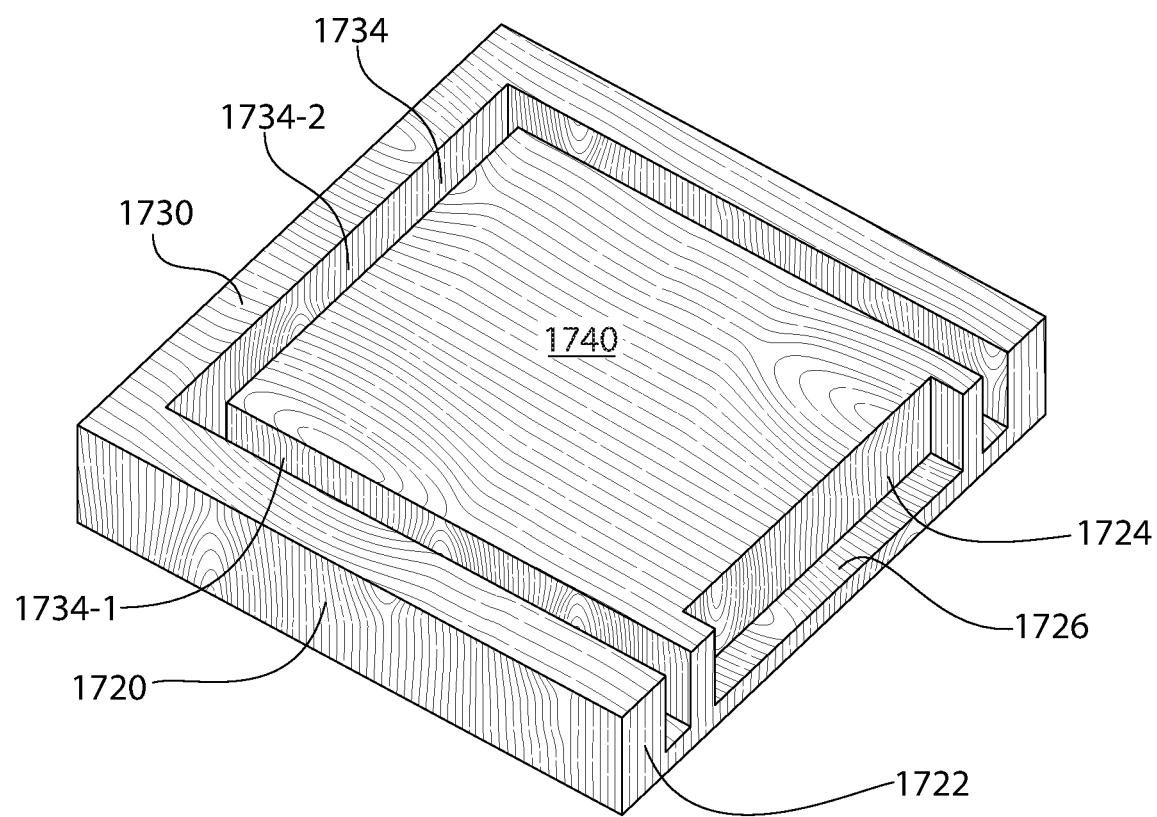
FIG. 43 is an upper perspective view of the underside of a shelf unit in accordance with exemplary embodiments of the invention.
Figure 44:
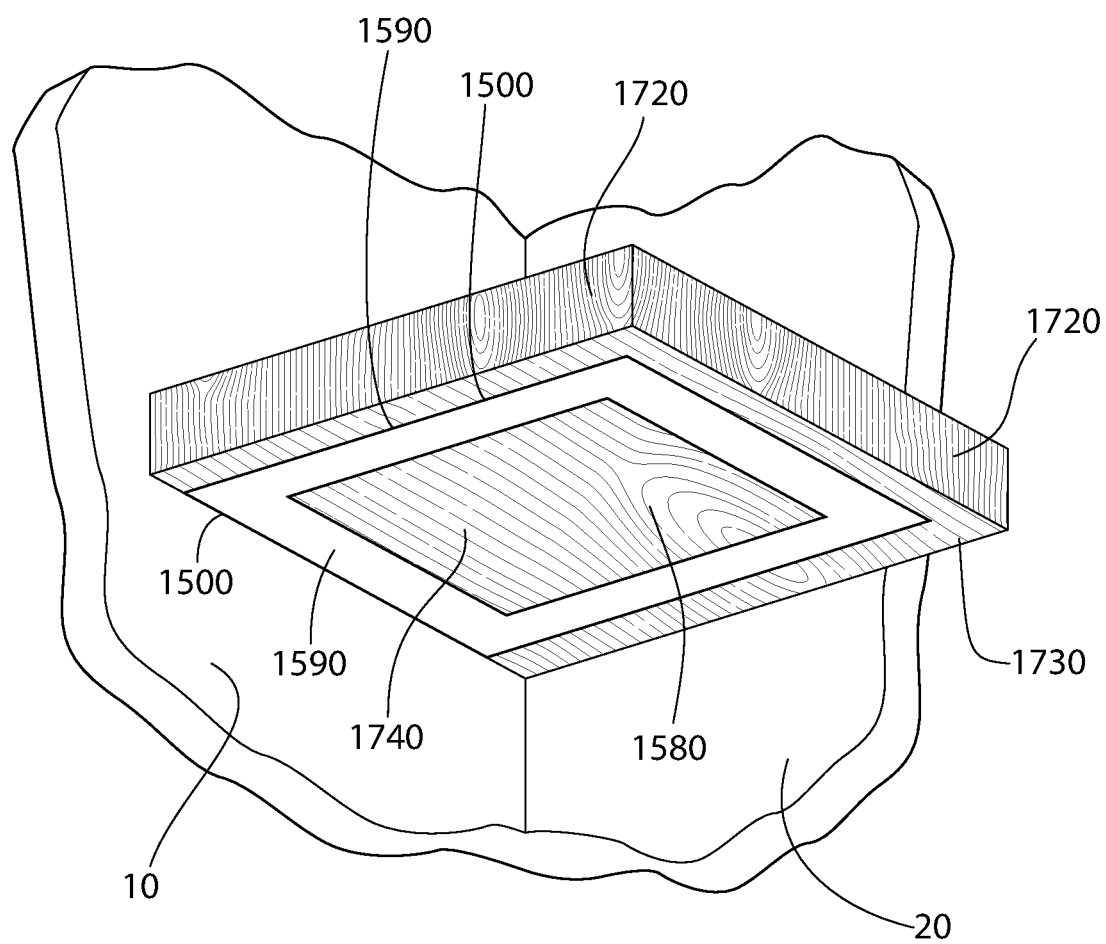
FIG. 44 is a lower perspective view of a shelf unit of FIG. 43, a mounting system, and a support in accordance with exemplary embodiments of the invention in an assembled state.

FIG. 43 shows an example of shelf insert 1700 that has a rectilinear channel 1734 formed in underside 1730 of shelf insert 1700. The channel 1734 is U-shaped including two parallel channel sections 1734-1 that extend front to back and perpendicularly to the rear side of shelf insert 1700 (and wall 10 when the insert is mounted), and a transverse channel section 1734-2 extending right to left between the front ends of the channels sections 1734-1. The rear ends of groove sections 1732-1 may be open. In contrast to groove 1732 above, channel 1734 may have a width substantially larger than the thickness of the side elements 1510-1540 of the perimeter frame (e.g. 2 times or more). Channel 1734 has a depth (measured between the top and bottom surfaces of shelf insert 1700) which is at least coextensive with the height of the side elements 1510-1530 of the perimeter frame (support structure 500) which are completely inserted into the channel to fully conceal the sides of the frame from view. Channel 1734 allows the top edges of side elements 1510, 1520, 1530 of support structure 1500 to extend beyond underside 1730 and upwards into channel 1734 so that side elements 1510, 1520, 1530 are completely concealed. This can provide a shelf that shows the material of shelf insert 1700 on all three of sides 1720, and also completely hides the otherwise exposed sides 1510, 1520, 1530 of perimeter frame support structure 1500 which are fully inserted into the channel. FIG. 44 shows this embodiment from underneath. Advantageously, because the sides 1510-1530 of the perimeter frame support structure 500 are not visible, all side elements 1510-1540 can be formed of unfinished metal which reduces material and fabrication costs. In embodiments where the side elements of the perimeter frame may be visible (see, e.g. side elements 410, 420, and 430 of support structure 500 not mounted to wall 10 seen in FIGS. 19 and 24, and side elements 1510, 1520, and 1530 seen in FIGS. 37-38), the side elements preferably have an external finished and esthetically pleasing appearance (e.g. polished/anodized metal, painted metal, etc.).

With either use of the groove 1732 or channel 1734 previously described herein in shelf insert 1700, the horizontal portions of the perimeter frame support structure 1500 will engage the underside of the central portion of the shelf insert circumscribed by the groove or channel to advantageously provide additional stability to the mount. In any of the embodiments with or without grooves/channels disclosed herein, threaded fasteners (e.g. screws) may be driven upwards through the horizontal portions of the perimeter frame support structures 500 or 1500 (not visible to room occupants) into the underside of shelf inserts 600, 700, or 1700 for more semi-permanent fixation and stability. Any suitable type of screws may be used for this purpose. The horizontal portions of the perimeter frames may include fastener holes to facilitate this semi-permanent fixation of the shelf inserts to the frames.

It is noted that features of certain embodiments can be combined with other embodiments to create embodiments not specifically shown in any of the drawings. As a non-exclusive example, recess 1735 can be included in the embodiments shown in any of the drawings.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents. In addition, all combinations of any and all of the features described in the disclosure, in any combination, are part of the invention.

What is claimed is:

1. A wall mounting system comprising:
    a force-distributing plate configured to be positioned against an outer surface of a wall;
    an item positioned adjacent to the force-distributing plate so that the force-distributing plate is positioned between the item and the outer surface of the wall, the force-distributing plate creating a gap between the item and the outer surface of the wall;
    a cover having a first rear face, a second rear face, and a ledge extending between the first and second rear faces, the first and second rear faces being parallel to each other and offset, the cover covering the force-distributing plate, the gap and an upper edge of the item, the first rear face of the cover contacting the item and the second rear face of the cover contacting the outer surface of the wall; and
    a fastener that extends through the cover, the item, and the force-distributing plate and is configured to extend into the wall to fasten the cover, the item, and the force-distributing plate to the wall.

2. The system according to claim 1, wherein the first rear face is formed by a first vertical section of the cover and the second rear face is formed by a second vertical section of the cover, and the ledge is horizontal.

3. The system according to claim 1, wherein the item is a shelf comprising a horizontal section and an adjoining vertical section which defines the upper edge.

4. The system according to claim 3, wherein the shelf is L-shaped.

5. The system according to claim 4, wherein the vertical section of the shelf is interspersed between the first rear face of the cover and the force-distributing plate.

6. The system according to claim 3, wherein the gap is formed between the wall and the vertical section of the shelf, and the cover has a horizontal length at least coextensive with a horizontal length of the vertical section of the shelf to completely cover the gap.

7. The system according to claim 3, wherein the gap is formed between the wall and the vertical section of the shelf, and the cover has a horizontal length less than a horizontal length of the vertical section of the shelf such that the force-distributing plate is covered by the cover and a portion of the gap remains exposed for inserting part of an accessory therein.

8. The system according to claim 1, wherein the item comprises a planar horizontal section and an adjoining planar vertical section, the ledge of the cover extending horizontally over a top of the vertical section.

9. The system according to claim 8, wherein the ledge of the cover further extends horizontally over a top of the force-distributing plate.

10. The system according to claim 9, wherein the vertical section of the item is interspersed between the cover and the force-distributing plate.

11. The system according to claim 1, wherein the cover, the item, and the force distribution plate comprise holes that are aligned, and wherein a first portion of the fastener extends through the holes in each of the cover, the item, and the force-distributing plate a second portion of the fastener abuts against an exposed surface of the cover and is prevented from passing through the hole in the cover, and wherein the first portion of the fastener is configured to extend into the wall.

12. The system according to claim 1, wherein the second rear face of the cover and a rear face of the force-distributing plate contacting the wall are co-planar.

13. A wall mounting method comprising:
    providing a cover having a first rear face, a second rear face, a ledge extending between the first and second rear faces, and a first hole, an item having a front surface and a second hole, and a force-distributing plate having a rear surface and a third hole;
    forming an assembly by inserting a threaded shaft of a fastener through the first hole in the cover, the second hole the item, and the third hole in the force-distributing plate with the item positioned between the cover and the force-distributing plate, a portion of the threaded shaft protruding from the rear surface of the force-distributing plate;
    abuttingly engaging the rear surface of the force-distributing plate against an outer face of a wall so that the portion of the threaded shaft extends through a pre-drilled hole in the wall, the item being spaced apart from the outer face of the wall by a thickness of the force-distributing plate, the first rear face of the cover contacting the front surface of the item and the second rear face of the cover contacting the wall; and tightening the fastener to secure the assembly to the wall.

14. The method according to claim 13 wherein the fastener comprises an expansion part coupled to the threaded shaft, and wherein the fastener is inserted into the pre-drilled hole in the wall so that the expansion part is positioned adjacent to an inner face of the wall that is opposite the outer face of the wall, and wherein tightening the fastener causes the expansion part of the fastener to expand outward and press against the inner face of the wall to secure the assembly to the wall.

15. A wall mounting system comprising:
at least one force-distributing plate comprising a rear surface that is in contact with an outer surface of a wall and a front surface opposite the rear surface;
an item comprising a rear surface that is in contact with the front surface of the at least one force-distributing plate and a front surface opposite the rear surface, the rear surface of the item being spaced apart from the outer surface of the wall by a thickness of the at least one force-distributing plate;
at least one cover comprising a rear surface and a front surface opposite the rear surface, the rear surface comprising a first portion and a second portion that are offset by a ledge, the first portion of the rear surface of the cover being in contact with the front surface of the item and the second portion of the rear surface of the cover being in contact with the outer surface of the wall; and
a fastener extending through aligned openings in the at least one cover, the item, and the at least one force-distributing plate and into the wall to couple the item to the wall.

16. The wall mounting system according to claim 15 wherein the at least one cover and the item cover an entirety of the at least one force-distributing plate.

17. The wall mounting system according to claim 15 wherein a first portion of the fastener protrudes from the outer surface of the wall, a second portion of the fastener protrudes from an inner surface of the wall, and a third portion of the fastener is positioned within the wall between the inner and outer surfaces of the wall.

18. The wall mounting system according to claim 15 wherein the at least one cover comprises a first vertical section comprising the first portion of the rear surface of the at least one cover, a second vertical section comprising the second portion of the rear surface of the at least one cover, and the ledge extending between the first and second vertical sections, wherein the first and second portions of the rear surface of the at least one cover are parallel to one another, and wherein the second portion of the rear surface of the cover is coplanar with the rear surface of the at least one force-distributing plate.

* * * * *